(12) United States Patent
Espinosa

(10) Patent No.: US 7,665,258 B2
(45) Date of Patent: *Feb. 23, 2010

(54) FASTENER ASSEMBLY SERVING AS A PRODUCT, OR COMBINED WITH OTHER COMPONENTS AS A PRODUCT, ALLOWS AUTOMATIC CONTROLLED MOVEMENTS IN ONE DIRECTION AND PREVENTS MOVEMENTS IN THE OPPOSITE DIRECTION WHEN FORCES ARE APPLIED

(76) Inventor: Thomas M. Espinosa, P.O. Box 1102, Woodinville, WA (US) 98072

( * ) Notice: Subject to any disclaimer, the term of this patent is extended or adjusted under 35 U.S.C. 154(b) by 184 days.

This patent is subject to a terminal disclaimer.

(21) Appl. No.: 11/594,191

(22) Filed: Nov. 8, 2006

(65) Prior Publication Data

US 2007/0175135 A1   Aug. 2, 2007

Related U.S. Application Data

(60) Continuation of application No. 11/087,519, filed on Mar. 24, 2005, now Pat. No. 7,159,366, which is a continuation of application No. 10/200,444, filed on Jul. 23, 2002, now Pat. No. 6,951,078, which is a division of application No. 09/737,952, filed on Dec. 18, 2000, now Pat. No. 6,494,654, which is a continuation-in-part of application No. 08/964,285, filed on Nov. 4, 1997, now Pat. No. 6,161,350.

(60) Provisional application No. 60/030,286, filed on Nov. 4, 1996.

(51) Int. Cl.
*E02D 27/00* (2006.01)

(52) U.S. Cl. .................. 52/293.3; 52/293.1; 52/295

(58) Field of Classification Search ............... 52/293.1, 52/293.3, 295, 292; 411/536, 353
See application file for complete search history.

(56) References Cited

U.S. PATENT DOCUMENTS

| | | | |
|---|---|---|---|
| 500,378 A | 6/1893 | Cohen et al. | |
| 573,452 A | 12/1896 | Delahunt | |
| 1,867,296 A | 7/1932 | Woodruff | |
| 2,096,452 A | 10/1937 | Eber | |
| 2,241,169 A | 5/1941 | Yokes | |
| 2,376,716 A | 5/1945 | Odin | |
| 2,382,291 A | 8/1945 | Carlberg | |
| 2,388,056 A | 10/1945 | Hendricks | |
| 2,548,844 A | 4/1951 | Myers | |
| 2,665,931 A | 1/1954 | Vegren | |
| 2,689,987 A | 9/1954 | Berger | |
| 2,777,718 A | 1/1957 | Vegren | |
| 2,827,770 A | 3/1958 | Bakker | |
| 2,881,876 A * | 4/1959 | Williams | 52/126.4 |
| 2,893,765 A | 7/1959 | Lyon | |
| 3,149,524 A | 9/1964 | Vecchi | |
| 3,151,891 A | 10/1964 | Sanders | |
| 3,402,952 A | 9/1968 | Nissen et al. | |

(Continued)

*Primary Examiner*—Basil Katcheves
(74) *Attorney, Agent, or Firm*—Shlesinger, Arkwright & Garvey LLP

(57) ABSTRACT

A fastener assembly 10, in respect to forces which are subsequently applied, after the installation thereof, when forces is applied in one direction, this fastener assembly 10 is self adjusting incrementally, as needed in travel or actuation; yet when a force is applied in the opposite direction, this fastener assembly 10 is not self adjusting and there is no travel or actuation.

19 Claims, 16 Drawing Sheets

U.S. PATENT DOCUMENTS

| | | | |
|---|---|---|---|
| 3,566,560 A * | 3/1971 | Wakefield et al. | 52/127.12 |
| 3,650,182 A | 3/1972 | Phillips | |
| 3,755,980 A | 9/1973 | Weidlinger | |
| 3,782,061 A | 1/1974 | Minutoli et al. | |
| 3,812,756 A | 5/1974 | Wenger | |
| 3,830,457 A | 8/1974 | Stewart | |
| 4,257,244 A | 3/1981 | Welschof | |
| 4,281,487 A | 8/1981 | Koller | |
| 4,441,286 A | 4/1984 | Skvaril | |
| 4,452,028 A | 6/1984 | Norton et al. | |
| 4,712,928 A | 12/1987 | Bradenstein | |
| 4,812,096 A | 3/1989 | Peterson | |
| 4,875,314 A | 10/1989 | Boilen | |
| 4,919,122 A | 4/1990 | Kohlenbrenner | |
| 5,002,318 A | 3/1991 | Witter | |
| 5,005,877 A | 4/1991 | Hayman | |
| 5,081,811 A | 1/1992 | Sasaki | |
| 5,098,241 A | 3/1992 | Aldridge et al. | |
| 5,180,268 A | 1/1993 | Richardson | |
| 5,271,199 A | 12/1993 | Northern | |
| 5,339,894 A | 8/1994 | Stotler | |
| 5,365,715 A | 11/1994 | Steinmetz et al. | |
| 5,379,562 A | 1/1995 | Hohmann | |
| 5,384,993 A | 1/1995 | Phillips | |
| 5,448,861 A | 9/1995 | Lawson | |
| 5,531,054 A | 7/1996 | Ramirez | |
| 5,535,561 A | 7/1996 | Schuyler | |
| 5,540,530 A | 7/1996 | Fazekas | |
| 5,549,011 A | 8/1996 | Shiga et al. | |
| 5,570,549 A | 11/1996 | Lung et al. | |
| 5,639,113 A | 6/1997 | Goss et al. | |
| 5,709,415 A | 1/1998 | Witter | |
| 6,047,503 A | 4/2000 | Kost | |
| 6,161,350 A * | 12/2000 | Espinosa | 52/293.3 |

\* cited by examiner

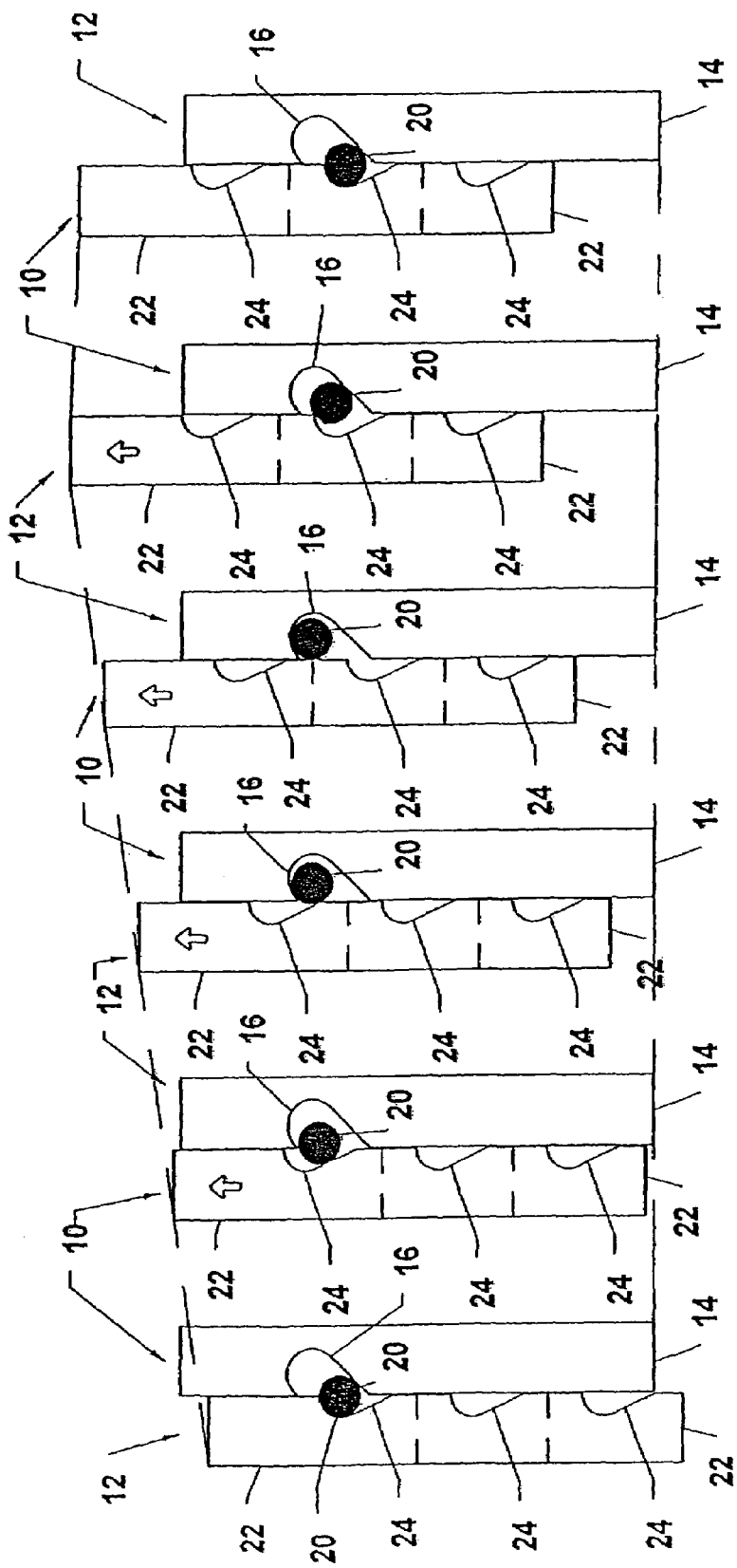

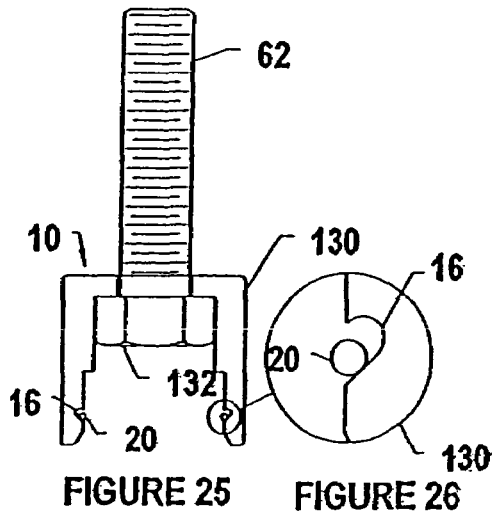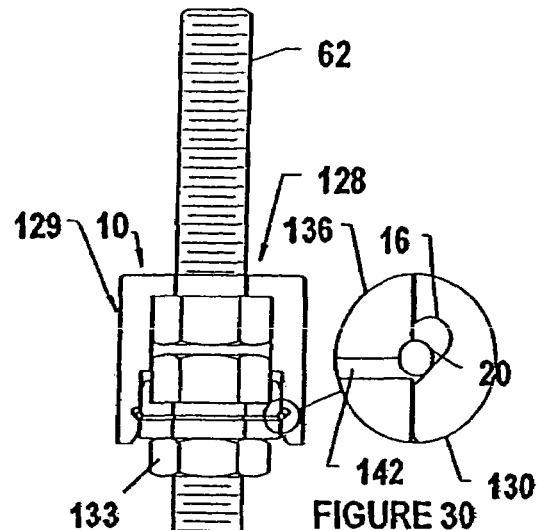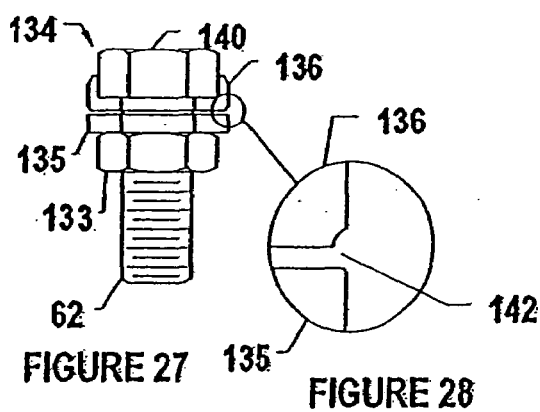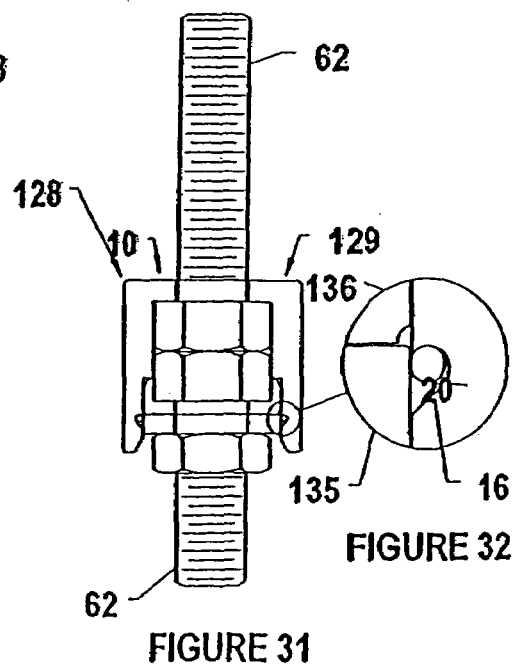
FIGURE 25
FIGURE 26
FIGURE 27
FIGURE 28
FIGURE 29
FIGURE 30
FIGURE 31
FIGURE 32

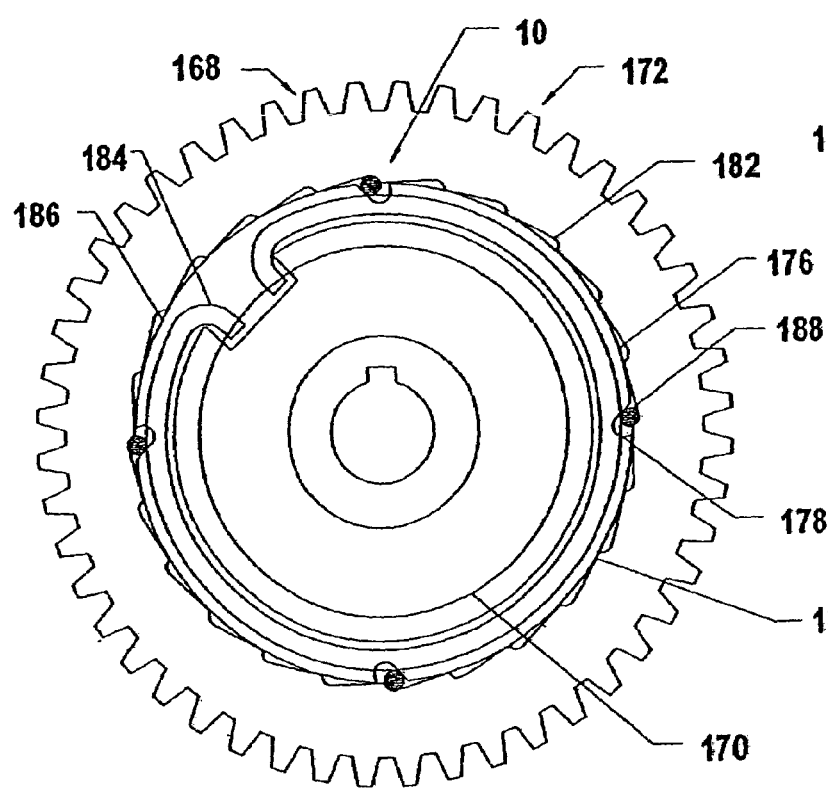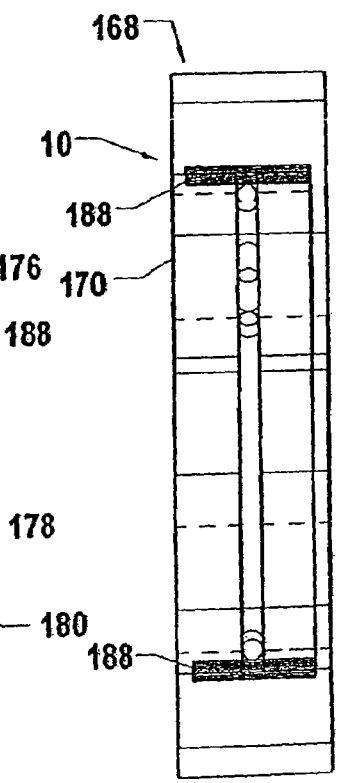
FIGURE 39
FIGURE 40

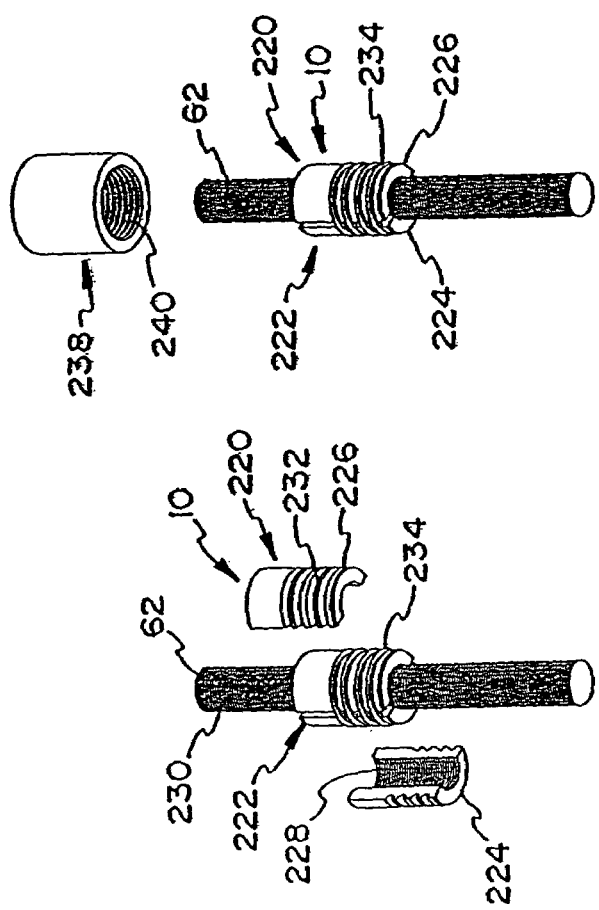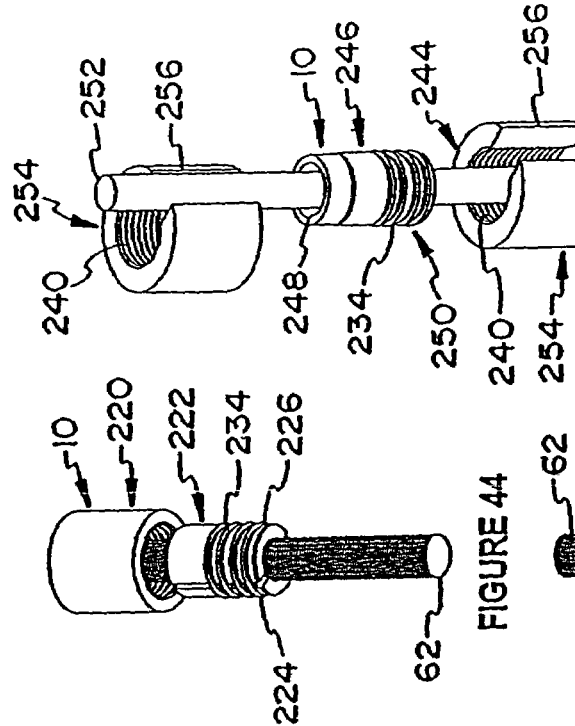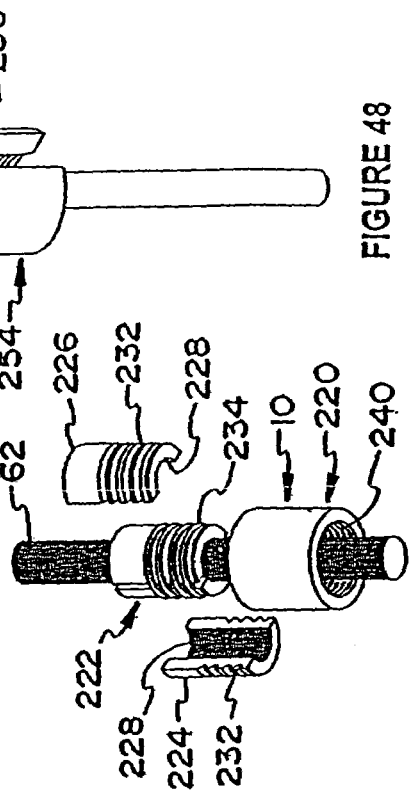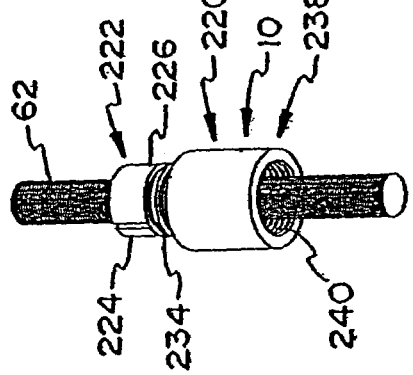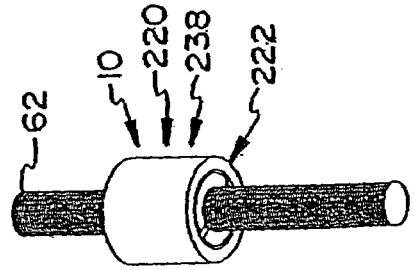

FASTENER ASSEMBLY SERVING AS A PRODUCT, OR COMBINED WITH OTHER COMPONENTS AS A PRODUCT, ALLOWS AUTOMATIC CONTROLLED MOVEMENTS IN ONE DIRECTION AND PREVENTS MOVEMENTS IN THE OPPOSITE DIRECTION WHEN FORCES ARE APPLIED

RELATED APPLICATIONS

This is a continuation of application Ser. No. 11/087,519, filed Mar. 24, 2005 now U.S. Pat. No. 7,159,366, which is a continuation of application Ser. No. 10/200,444, filed Jul. 23, 2002, now U.S. Pat. No. 6,951,078, which is a division of application Ser. No. 09/737,952, filed Dec. 18, 2000, now U.S. Pat. No. 6,494,654, which is a continuation-in-part of application Ser. No. 08/964,285, filed Nov. 4, 1997, now U.S. Pat. No. 6,161,350, which claims the priority benefit of Provisional Application Ser. No. 60/030,286, filed Nov. 4, 1996.

BACKGROUND HISTORY

In the development of lock detent mechanisms which provide a movement in one direction and prevent movement in the opposite direction, Hendricks, U.S. Pat. No. 2,388,056, shows an adjustable stool or the like furniture article which can be moved in one direction and locked against movement in the other direction by means of a ball detent type construction. A release mechanism is provided. Aldridge also shows a detent lock mechanism of a general type in which there are a pair of sleeves with recesses on both sides for receiving a third member. The mechanism operates in one direction and locks in the opposite direction but can be released by a release spring.

Shiga, U.S. Pat. No. 5,549,011, discloses a three member structure providing inner and outer members which are recessed and provide locking in one direction and adjustment in the other direction for the third member which can be, by centrifugal force moved into a "fish hook" like pocket, so that movement in one direction can be made.

Stotler, U.S. Pat. No. 5,339,894, discloses a mechanism used in oil wells in which there are two sleeves and a third member such as a ball between the two sleeves. Pockets in each of the sleeves are provided for the ball and are designed so that movement of one sleeve in one direction will permit the ball to travel and lodge in the other sleeve and prevent the sleeves from movement when reversed direction is applied to the first movable sleeve. The primary difficulties with these various developments has been the failure of the locking member to properly fit into the lock mode causing damage or shifting of the sleeve members relative to each other or which requires manual manipulation which can be difficult at times requiring additional tooling to get it released in order to provide adjustment.

SUMMARY

When this fastener assembly either is serving directly as a product, or this fastener is combined with other components as a product, then after the installation thereof when a force is applied in one direction, this fastener assembly is self adjusting incrementally, as needed in travel or actuation; yet when a force is applied in the opposite direction, this fastener assembly is not self adjusting and there is no travel or actuation.

This fastener assembly, and respective embodiments, is arranged in cylindrical, arcuate, tubular and planar configurations. There are at least three members in each embodiment. There is a first member and a second member, which under a force of sufficient magnitude applied in one direction, will move relative to one another a preset distance, to await another force of sufficient magnitude of like direction to cause a like relative movement through another preset distance, thereafter repeating the sequences of relative movements in respect to respective designed embodiments, in this same one direction of the applied force. Yet, any force applied in the opposite direction, will not cause any essential opposite direction of the relative movement between the first member and second member.

This controlled one direction movement, centers on the utilization of the alternate positioning of a third member, called the locking member, which is controllably confined by both the first member and second member, when they are closely spaced apart in the assembled fastener assembly. During the preset locking positions, the locking member is partially received internally respectively in both the first member and the second member.

Any attempt to apply a force at this relative position of the first member and second member, in the opposite direction, is prevented, as this third member serves as the locking member, by being partially extending internally into both the first member and the second member. Yet when a wanted self adjusting force of sufficient magnitude is applied, the first member and second member are moved sufficiently, so the first member fully receives internally the locking member, which then has been moved clear of the second member.

The first member has a full receiving volume with a cam surface to guide and to fully receive the third member, then positioned out in the locking position. The second member has a partial receiving volume with a cam surface to guide and to partially receive the third member into the locking position.

In this embodiment of only the three members, the third member must be resilient enough to be either expanded or contracted from a pre-installed relaxed state, so when installed, the third member will always be attempting, via the stored energy thereof, to return to the locked position thereof, when partially extending internally into both the first member and the second member, to keep from moving, one relative to the other.

In some other embodiments, the third member is not resilient, such as a spherical locking member, an arcuate locking member, or a linear locking member. In these embodiments, when the third member is non-resilient, then a fourth member, having resiliency and sufficient stored energy, is needed to complete an embodiment of the particular fastener assembly, having at least four members. This fourth member will be positioned inside the first member in the locale of the full receiving volume thereof, to movably be always ready to direct the locking member, i.e. the third member, into the locking position thereof, when partially extending into both the respective volumes of the first member and second member.

In some other embodiments, when the third member is a resilient locking member, the first member is formed of two parts, which are movable relative to one another. Each of these two parts have both partial receiving volumes and partial cam surfaces. When the two parts are moved substantially apart, from a total locking configuration, clearance is provided to fully receive the third member, which via the stored energy thereof, moves fully into the clearance volume of this first member, formed of two parts. Then the first and second members may be moved relative to one another free of incremental stops. However, when the two parts are moved only a short distance part from a total locking configuration, relative movement in one direction is essentially prevented, and relative movement in the opposite direction is undertaken in incremental movements between locking positions.

In some other embodiments, when the third member is a resilient locking member, the second member is formed of two parts, which are movable relative to one another. One of these two parts has a partial receiving volume. When the two parts are moved directly together, in contact with one another, then the locking member is directed completely into the receiving volume of the first member, and the first member and the second member are relatively moved freely in either direction. When the two parts are moved apart a short distance, then relative movement soon permits the resilient third member to be positioned partially in both the first member and the second member having the two parts, locking these first and second members together, preventing relative movement in either direction. Then when the two parts of the second member are moved farther apart, then the relative movement in the one relative movement direction, soon permits the resilient third member to be moved completely into the receiving volume of the first part to permit an incremental movement until the next locking position is reached. Yet a relative movement in the opposite direction results in quickly reaching a locking position of the first and second parts, before any substantial incremental movements occurs.

OBJECTS OF THE INVENTION

It is an object of this invention to provide a one way adjustment mechanism which will work under adverse conditions such as earthquakes, high winds and the like prevailing on building structures or other types of equipment including adjustment mechanisms in tooling, machinery, furniture and the like.

Another object of this invention is to provide a system which will prevent uplifting in walls while compensating for settlement, shrinkage, or compression loading and permits continual ratcheting downward of the fastener assembly.

Another object of this invention is to provide a system which will compensate for wood shrinkage and compression loading.

Yet further object of this invention is to provide a mechanism which will remain tight after cyclic loading.

Still a further object of this invention is to provide a fastener assembly which will provide a straight load path to a foundation anchor of a building or the like.

Yet another object of this invention is to provide a fastener assembly used in seismic hold downs that help prevent uplift which separates a wood frame building from its foundation during an earthquake or high winds since a typical hold down will experience somewhere in the range of ¼ inch to ½ inch of shrinkage at each floor connection.

A further object of this invention is to provide a fastener assembly which will be actuated in 0.07 inch increments (less that one half of an inch) with a force of only about 15 pounds and with an ultimate load ranging from about 39,000 pounds to about 120,000 pounds using rod sizes from about ⅜ inch rods to about 1 inch rods.

A further object of this invention is to provide a fastener assembly which enhances lateral structural stability of building or the like and which exceeds the strength of the surrounding wood members.

Yet another further object of this invention is to provide a fastener assembly hold down which far surpasses existing strap or rod hold down systems.

Yet another further object of this invention is to provide a fastener assembly which is inexpensive and readily manufactured and of simple assembly.

These and other objects of the present invention will be apparent from the following description including the drawings in which:

DRAWINGS

Some of the various embodiments of this fastener assembly, which themselves are a final assembly, and also which are incorporated in other assemblies, which in turn are either final assemblies, or are subsequently installed in other final assemblies, structures, machinery or products, are illustrated in the drawings, wherein:

FIGS. 1A, 1B, 1C and 1D are partial sectional views showing in sequence of operation a portion of a preferred embodiment having three components, also referred to as three members, having a first member, also referred to as a receiver component, a second member, also referred to as an engagement component, a third member, also referred to as a locking component, with the first member having a full receiving volume with a cam surface to guide and to fully receive the third member, with the second member having a partial receiving volume with a cam surface to guide and to partially receive the third member, and with the third member being resilient and either being expanded or contracted, when installed, depending on the overall configuration of the three member embodiment, to thereafter, when confined between the first and second members, to be always trying to return to the relaxed pre-installation configuration thereof, and in so doing to be always tending to move into the locking position thereof, preventing the relative movement of the first and second members, positively keeping them from relative movement in one direction, regardless of the magnitude of the force being applied, and allowing only incremented relative movements in the opposite direction in the presence of a sufficient force being applied in this opposite direction;

FIG. 2, is a partial sectional view of a portion of a preferred embodiment having three components, also referred to as three members, as somewhat similarly illustrated in FIG. 1A, showing, however, how the second members also called the engagement component, has multiple partial receiving volumes, each with a cam surface, to guide and to partially receive the third member into the respective incremental locking positions, which can occur in only the relative movement in one direction of the first and second members, and the phantom circle illustrates the never reached relaxed position of the installed resilient locking component, i.e. the third member of this three member embodiment;

FIG. 3 through 8, are respective changing sequential partial sectional views of a portion of a preferred embodiment having three components, also referred to as three members, as somewhat similarly illustrated in FIGS. 1 and 2. The second member, also called the engagement component, which has multiple partial receiving volumes, each with a cam surface, to guide and to partially receive the third member into the respective incremental locking positions, which can occur in only the relative movement in one direction, is illustrated as moving relative to the first member. During this sequential movement, the locking component, i.e. the third member, is directed out of the locking position and then subsequently cleared to resiliently return, via the stored energy thereof, to reach the next locking position of this sequential incremental movement of the second member with respect to the first member;

As noted in reviewing FIGS. 1 through 8, when the unlocking commences and continues, both the first and second members work together to guide, force, manipulate, and control, the resilient and deflectable locking member. At this time, both the first and second members are applying forces on the same side of the cross section area of the length of the resilient and deflectable locking member as noted in FIGS. 1A, 1B, 1C and 1D;

FIGS. 9 and 10 illustrate how a preferred embodiment of the fastener assembly, shown essentially in FIGS. 1 through 8, is used in other assemblies comprising respective tie down systems which anchor shear walls on wood frame constructed buildings, to resist uplift forces caused by earthquakes and high winds, with FIG. 9 being a partial elevational view, partially in section, showing the installed relative positioning of the fastener assembly members and their respective connections to other parts of the tie down system, and with FIG. 10 also being the same presentation; except showing a subsequent time when the wood, i.e. lumber, of the building, has undergone shrinkage and/or compression, and the fastener assembly has automatically adjusted to keep the tie down system completely effective;

FIGS. 11, 12, and 13 illustrate how a preferred embodiment of the fastener assembly shown in FIGS. 1 through 10, is used in a respective tie down system, respectively, in a one story building of FIG. 11, a two story building of FIG. 12, and a three story building of wood frame construction;

FIG. 14 is an exploded perspective view of the separated three members of the preferred embodiment of the fastener assembly, which is arranged in cylindrical components and which is utilized in other assemblies, such as the tie down system illustrated in FIGS. 9 through 13, showing second, third and first members, i.e. the engagement, locking and receiver components;

FIGS. 15 and 16 are schematic partial sectional views indicating how a three member embodiment is arranged respectively, when the first member, i.e. the receiver component, is formed on an arc, and the full receiving volumes are on the convex surface thereof, and the partial receiving volumes of the second member, i.e. the engagement component, are on the arcuate concave surface thereof, as shown in FIG. 15, and then in FIG. 16, these convex and concave surfaces are of the opposite configuration of the arcuate cooperating surfaces;

Figure 33:
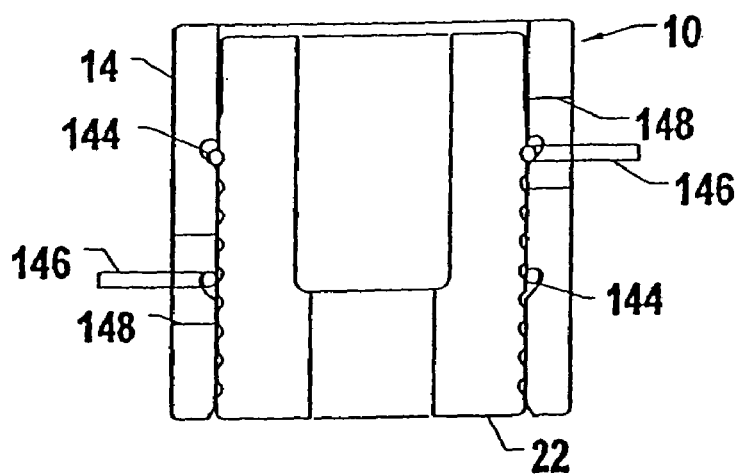
Figure 34:
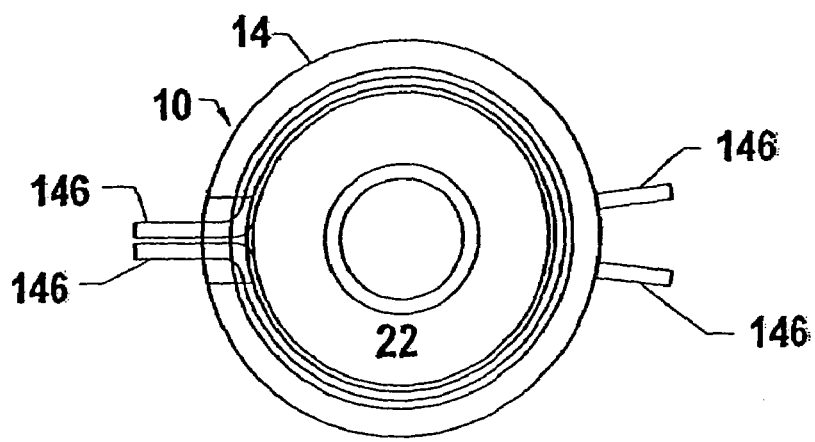
Figure 35:
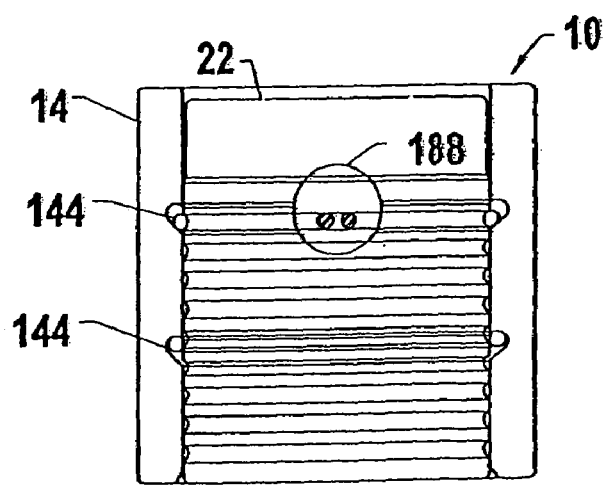
Figure 36:
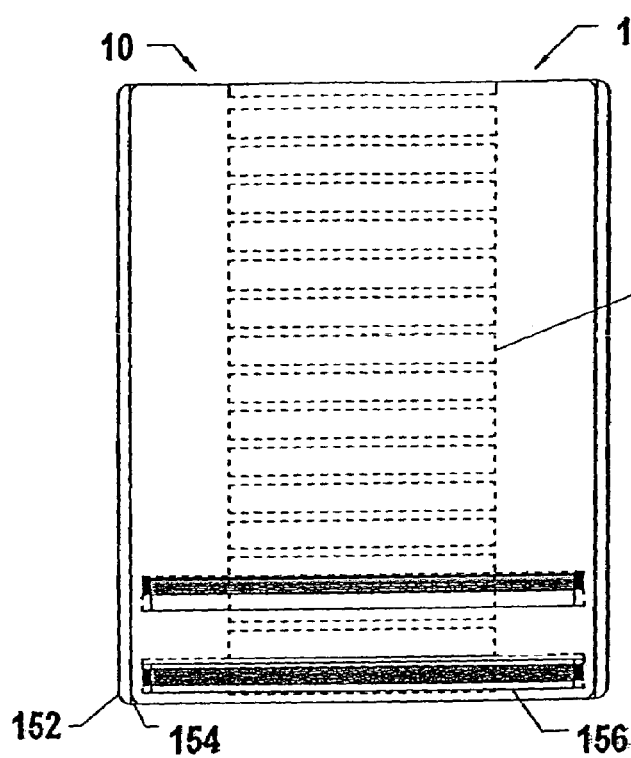
Figure 38:
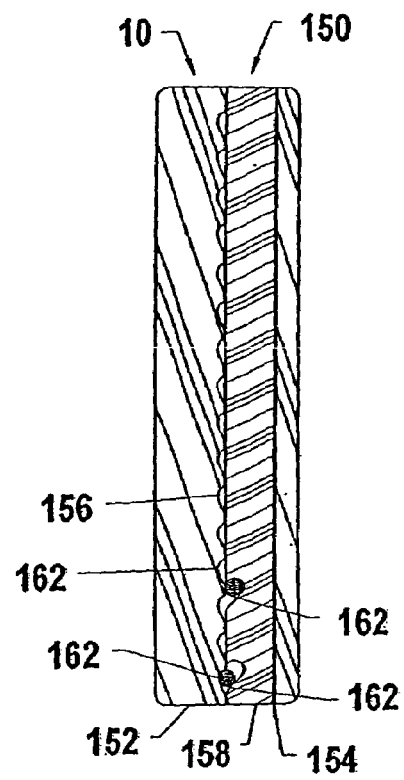
Figure 37:
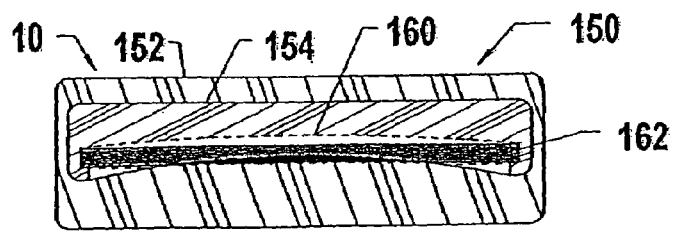
Figure 41:
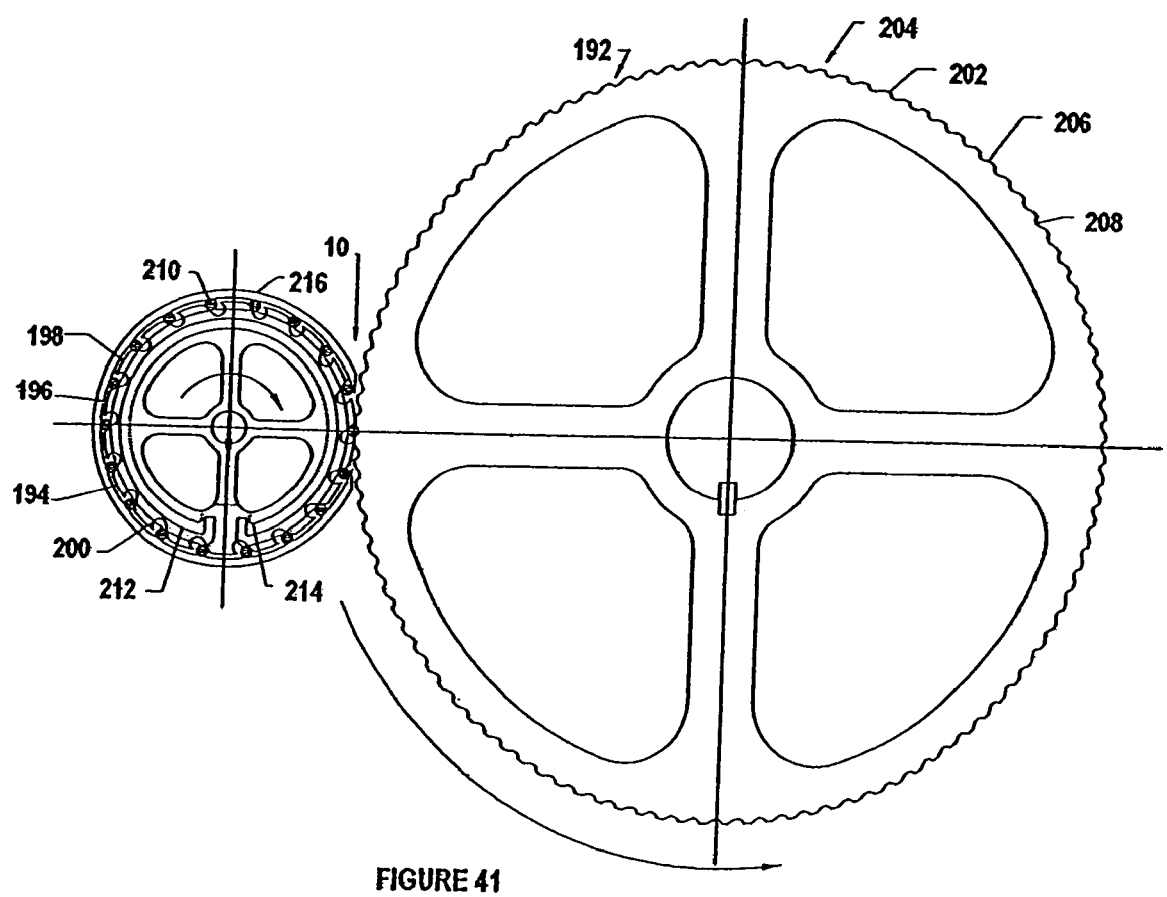

FIGS. 25 through 32 illustrate how the three member embodiment of the fastener assembly is utilized with an assembly for both quickly assembling two elongated threaded rods or bolts, without relatively rotating these rods, and yet by a limited rotation of a jam nut on one rod, the rods soon thereafter are separated, without relatively rotating these rods, with FIG. 25 showing in partial sectional view how the female member on one rod, serves as the first member to position and to fully receive the third member, FIG. 26 showing in a sectional partial enlargement the positioning of the first and third members;

FIG. 27 showing in a partial sectional view how the male member on the other rod, serves as the second member to position and to partially receive the third member;

FIG. 28 showing in a sectional partial enlargement the positioning of the second member, which has two sections that are moved together and apart;

FIG. 29, showing in a partial sectional view how the male member has been inserted in the female member, resulting in their locking together, and consequently securing the rods together;

FIG. 30, showing in a sectional partial enlargement the positioning of the first, second and third members when the locking has been undertaken;

FIG. 31, showing how a jam nut has been rotated to change the configuration of the two part second member and thereby change the configuration of the partial receiving volume, to move the third member fully into the full receiving volume of the first member, and thereby allowing the quick non-rotating pulling apart of the rods; and, FIG. 32, showing in a sectional partial enlargement, the positioning of the first, second and third members which then allow the separation of the rods;

FIGS. 33 through 35 illustrate a three member embodiment of the fastener assembly, arranged in cylindrical form, with the third member, i.e. locking component being externally adjustable to adjust the resilient force thereof, and to thereby clear the locking component from the locking position thereof, with FIG. 33 being a partial cross sectional view, FIG. 34 being a top view, and FIG. 35 being a side view, with hidden lines being used specially in FIGS. 34 and 35 to illustrate the interior arrangements of the three members;

FIGS. 36, 37, and 38 illustrate a three member embodiment of the fastener assembly, arranged in a substantially planar form, with the third member, i.e. locking component, being externally adjustable to adjust the resilient force thereof, and to thereby clear the locking component from the locking position thereof, with FIG. 36 being a top view, FIG. 37 being an end view, and FIG. 38 being a side view, with hidden lines being used in these figures to illustrate the interior arrangements of the three member assembly;

FIGS. 39 and 40 in partially sectional views illustrate an embodiment having four members of the fastener assembly, arranged with other members to make an overall winch-type gear system, and the fourth member is a resilient positioning member, which positions several alike third members, which are non-resilient locking components; with FIG. 39 being a partial sectional view, and FIG. 40 being a side view, with hidden lines being used in these figures to illustrate the interior arrangements of the four member assembly and portions of winch-type gear system;

FIG. 41 is a partially sectional view illustrating an embodiment having four members of the fasteners assembly, arranged with other members to make an overall spur gear and main gear of a drive system, and the fourth member is resilient positioning member, which positions several alike third members, which are non-resilient locking components;

FIGS. 42 through 47 are related perspective views, with phantom lines showing the pre-positioning and post-positioning of a first member, and motion arrows to indicate assembly and disassembly movements of the first and second members, in this illustrated embodiment, which is conveniently placed at a selected location on an extended threaded tie rod, by having the first member made in two halves of a cylinder; and, FIG. 48 is a perspective view with phantom lines showing the pre-positioning and post-positioning of a second member, and motion arrows to indicate assembly and disassembly movements of the second member, in this illustrated embodiment, which is conveniently placed at a selected location on an extended member of circular cross section, by having the second member made with an axial directed opening, which accommodated the pre-positioning of the second member about the extended member of circular cross section.

A GENERAL DESCRIPTION OF THE EMBODIMENTS

The fastener assemblies illustrated in the figures of the drawings, have at least three members. When the third member is not resilient, then a fourth member which is resilient is included in the fastener assembly. These respective fastener assemblies, in their various embodiments, may themselves be a product or they may be combined with other members and assemblies to become another product, which in turn may be an end product, or yet may be installed with other members and assemblies to become another product.

The fastener assemblies are arranged in cylindrical, arcuate and planar embodiments, and the third member, also referred to as the locking component, is provided in many shapes in respect to the many embodiments of the fastener assembly.

Each embodiment of the fastener assembly has a first member, also referred to as a receiver component, which has a full receiving volume with a cam surface, to guide and to fully receive the third member. Also, each embodiment of the fastener assembly has a second member, also referred to as the engagement component, which has a partial receiving volume, with a cam surface to guide and to partially receive the third member.

The third member, serving as the locking component, either by resiliency thereof, or if not resilient, then by the resiliency of the fourth member, is always being directed into the locking position thereof. When the third member is in the locking position, the third member is located in both the partial receiving volume of the second member, and the full receiving volume of the first member.

When the third member is in this locking position, the respective volumes are so formed in their respective overall angular positions and contours, that the closely spaced first and second members, while confining the third member, i.e., the locking component, will not move under any applied force in one relative movement direction thereof. However, when they are moved in the other relative movement direction thereof, under a sufficient applied force, the first and second members will move, as the third member is temporarily moved by the action of the first and second members, to be entirely within the full receiving volume of the first member.

In a fastener completed as a product, or incorporated into other products, additional arrangements are made for additional receiving volumes, of either or both of the first and second members, and also in some embodiments, for additional third members, so the relative movements of the first and second members are incremental in the one direction. Yet at all times, any alternated movement of the first and second members in the opposite direction is not possible, unless, in a particular embodiment of the fastener assembly, the resilient member is positioned to be accessible in part, to receive an outside applied intentional force, which keeps the resiliency created return force from being effective in keeping the third member in the locking position thereof.

The Three Member Embodiment

The fastener assembly 10, in the three member embodiment 12, is illustrated in FIGS. 1 through 8, to show a preferred arrangements of at least the minimal portions of at least three members, and how the respective relative movements thereof occur, during the sequences of their locking, in the presence of a relative force applied in one direction, and their incremental movement, in the presence of a relative force applied in the other direction. The assembly 10 may be color coded.

The first member 14 is oriented in some instance longitudinally axially and in others arcuately or circularly and, also called the receiver component 14, has a full receiving volume 16, with a cam surface 18, arranged on a bias, i.e., on an angle, so cam surface 18 is effective in guiding the movement of the third member 20 showing a center line C, also called the locking component, into and out of the full receiving volume 16. A third member 20 is circular-in-cross-section and may be a ball, ring or a roller or the like and must be in cross-section at least about 0.0005 inches less than the diameter and/or width of the first member 14 receiving volume 16. The receiving volume 16 is of "fish hook" configuration. The end of the "fish hook" is preferably a straight line tangent 21 parallel to surface 18 and ending in a point P.

The second member 22 which is oriented in some instances longitudinally axially and in others arcuately circularly and in a direction parallel to the first member, and also called the engagement component, has a partial receiving volume 24 of semi-teardrop shape, with a cam surface 26, arranged on a bias, i.e., on an angle, so the cam surface 26 is effective in guiding the movement of the third member into and out of the locking position, in conjunction with the cam surface 28 on the first member 14. First and second members 14 and 24 have parallel longitudinal axis and have complimentary volumes when positioned adjacent each other.

During the assembly of the first member 14 and the second member 22, the third member 20 circular in cross-section is confined by them. The first and second members each having a planar surface 28 and 30, which after assembly, are parallel to one another and slightly spaced apart. The respective entrances 32 and 34, of the receiving volumes 16 and 24 are located in these respective planar surfaces 28 and 30. The three members 14, 20 and 22 may be of different material such as plastic metal, etc. Some resiliency may be provided, but third member 20 should have only slight resiliency to avoid collapse under pressure. It is important that at least one of the first and second members 14 and 22 should have some malleability and that third member 20 should be of harder material. When member 20 is positioned in locked mode on members 14 and 22, member 20 causes indenting of at least the one of the members 14 and 22 thus increasing the contact area and load conveying ability of the assembly.

A portion 36 of the partial receiving volume 24 of the second member 22 is curved to complementary receive a curved portion of the third member 20, which preferably has a circular cross section 38.

Figure 1A:
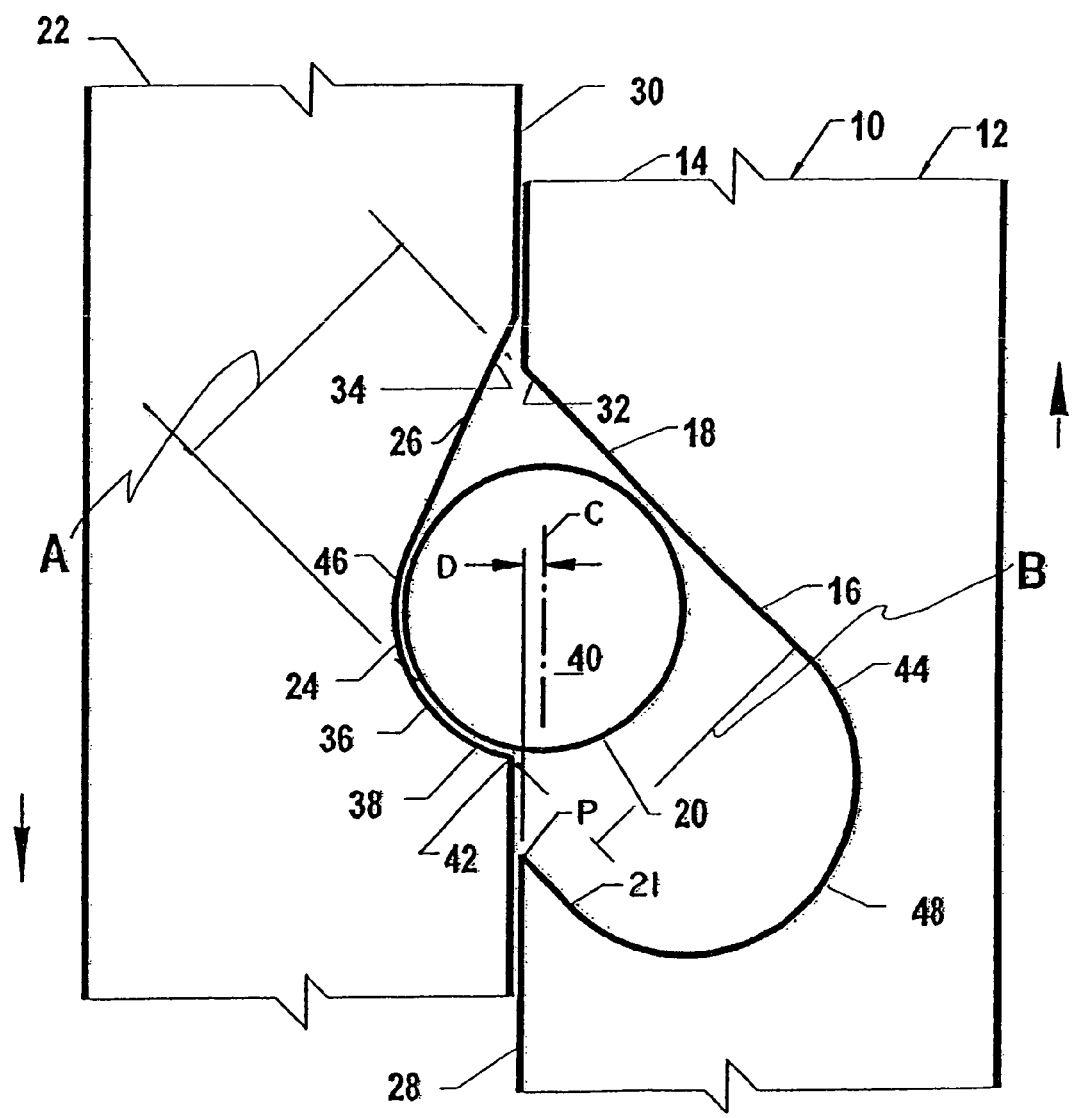
Figure 1D:
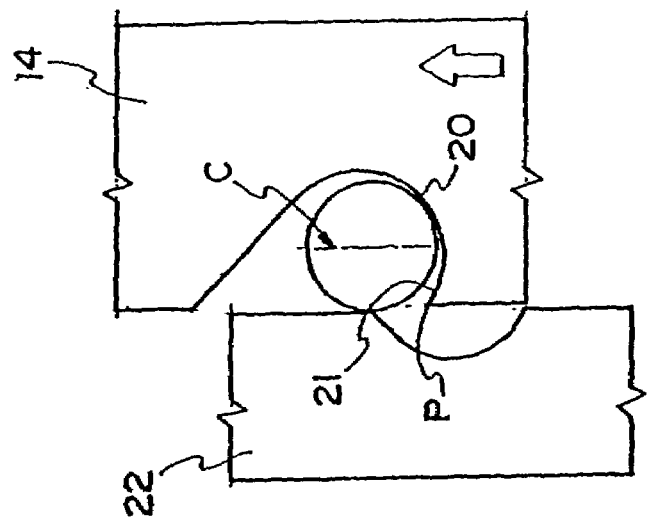
Figure 1C:
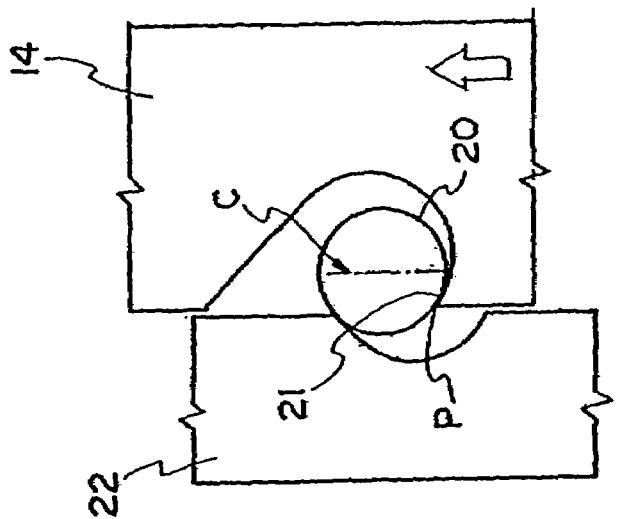
Figure 1B:
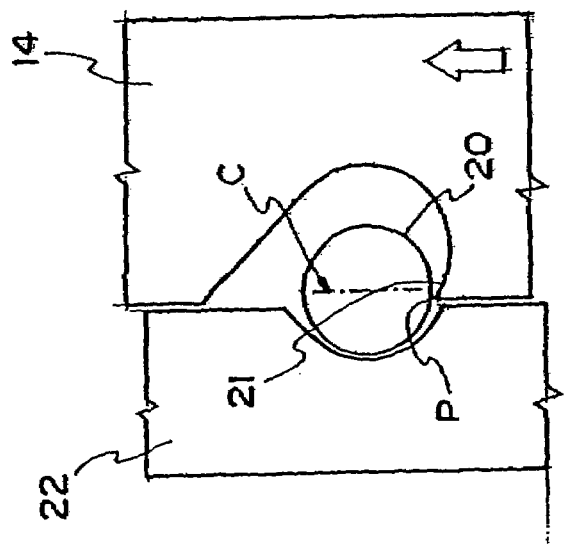

In FIG. 1A, the locked position is illustrated of the fastener assembly 10. The third member, during the locking position, is positioned by this curved portion 36 and the cam surface 26 of the second member, and the cam surface 18 of the first member.

At this locked position time of the first and second members, the transverse distance A measured in the angular combined receiving volumes 16 and 24, and extending between the middle 36 of the curved portion 38 of the second member 22 and the cam surface 18 of the first member 14, is long enough to accommodate the circular cross section of the third member 20 having volume 40, i.e., the locking component 20. This transverse distance A is greater than the parallel transverse distance B, measured in the angular combined receiving volumes 16 and 24, and extending between the terminus 42 of the curved portion 38 at the planar surface 30 of the second member 22, and the cam surface of the first member 14. This parallel transverse distance B is not long enough to accommodate the circular cross section of the third member 20 having volume 40, i.e. the locking component 20, and therefore, the third member 20 is confined in the locking position thereof.

When the third member 20, i.e. the locking component, is in this locking position, the first and second members 14 and 22, will not essentially move relative to one another, in respect to one direction of their relative movement, regardless of the force applied, short of a fully destructive force. However, if a sufficient force is applied in the opposite relative direction, as indicated by the motion arrows in FIG. 1A, then the first and second member 14 and 22 will move relative to one another. When this wanted movement occurs, when a designed or specified sufficient force is applied, the respective cam surface 26 of the second member and the cam surface 18 of the first member are effective in directing the third member 20 into the full receiving volume 16 of the first member 14.

The restrictive transverse distance B is eliminated during this direction of the intended relative movement of the first and second members.

In FIG. 1A, the angle between the planar surface 28 of the first member 14 and the cam surface 18 of the first member 14 is preferably 45 degrees in a range of 10 degrees to 85 degrees. The angle between the planar surface 30 of the second member 22 and the cam surface 26 of the second member 22 is preferably 25 degrees, in a range of 10 degrees to 85 degrees. The selection of these respective selected angles, results in the positioning of the respective cam surfaces 18 and 26, so they effectively guide the third member 20 into and out of the locking position. The angular cam surfaces 18 and 26 continue until reaching the respective tangent locations 44 and 46, with a curved portion 36 of the partial receiving volume 24, and the preferably half circle portion 48 at the terminus of the full receiving volume 16.

Figure 2:
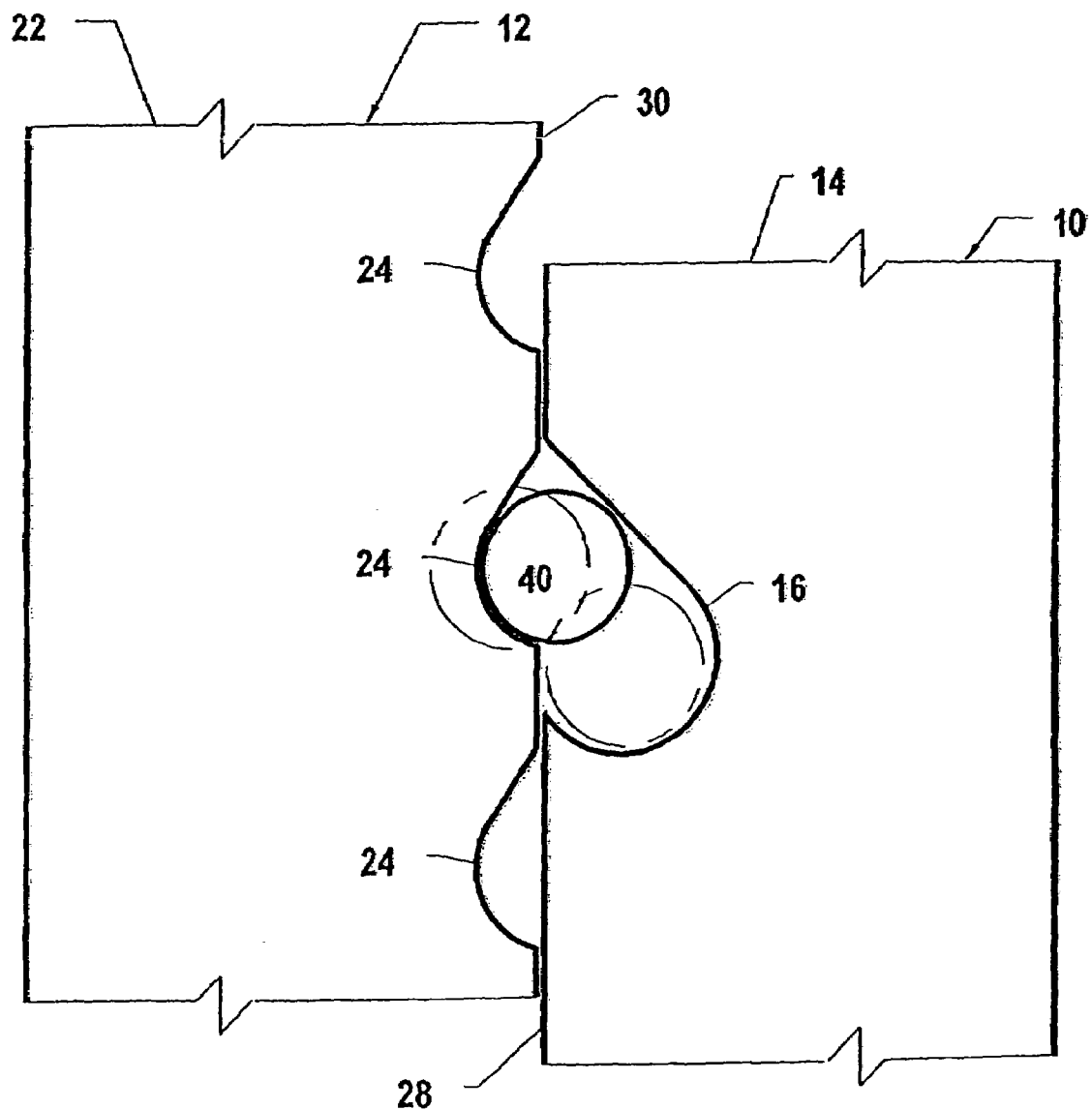

As illustrated in FIG. 2, the three members of the fastener assembly 10, in respect to this embodiment 12, are altered so the second member 22, the engagement component 22, has additional partial receiving volumes 24, spaced from one another. Therefore, the wanted relative directional movements are incremental between the times when the locking component 20, i.e. the third member 20, reaches another spaced locking position.

As illustrated by the phantom circular lines in FIG. 2, if the third member 20 could expand freely again, this position would be reached. In this embodiment of three members, the third member 20 must be a resilient member, and always trying to move into the locking position when the third member 20, the locking component 20, is confined by both the receiving volumes 16 and 24, of the respective first and second members 14 and 22.

The incremental movement between two locking positions of this three member embodiment 12 of the fastener assembly 10 is illustrated in the respective sequences shown in FIGS. 3 through 8. In FIG. 3, the locking has occurred in respect to particular first partial receiving volume 24, and then the sequential movements are shown in FIGS. 4, 5, 6, and 7, with FIG. 8 showing the nest locking occurring in respect to a second partial receiving volume 24, which then is cooperating with the full receiving volume 16 of the first member. It is necessary that the volume 16 is always in contact with a volume 24 during incremental movements. This allows for proper displacement while maintaining structural strength during earthquakes, etc.

In other embodiments, there are additional full receiving volumes 16 and additional third members 20, i.e. locking members 20, to meet different requirements and specification for different products in which the fastener assembly 10 is utilized.

The Utilization of the Fastener Assembly in the Construction of Wood Framed Buildings The fastener assembly 10 arranged in the three member embodiment 12 illustrated in FIGS. 1 through 9, and as described in reference to these figures, is further illustrated in another embodiment modification, which is cylindrical arranged and combined with other components to become a tie down system 50 for wood frame structures, as shown in FIGS. 9 through 14.

Figure 10:
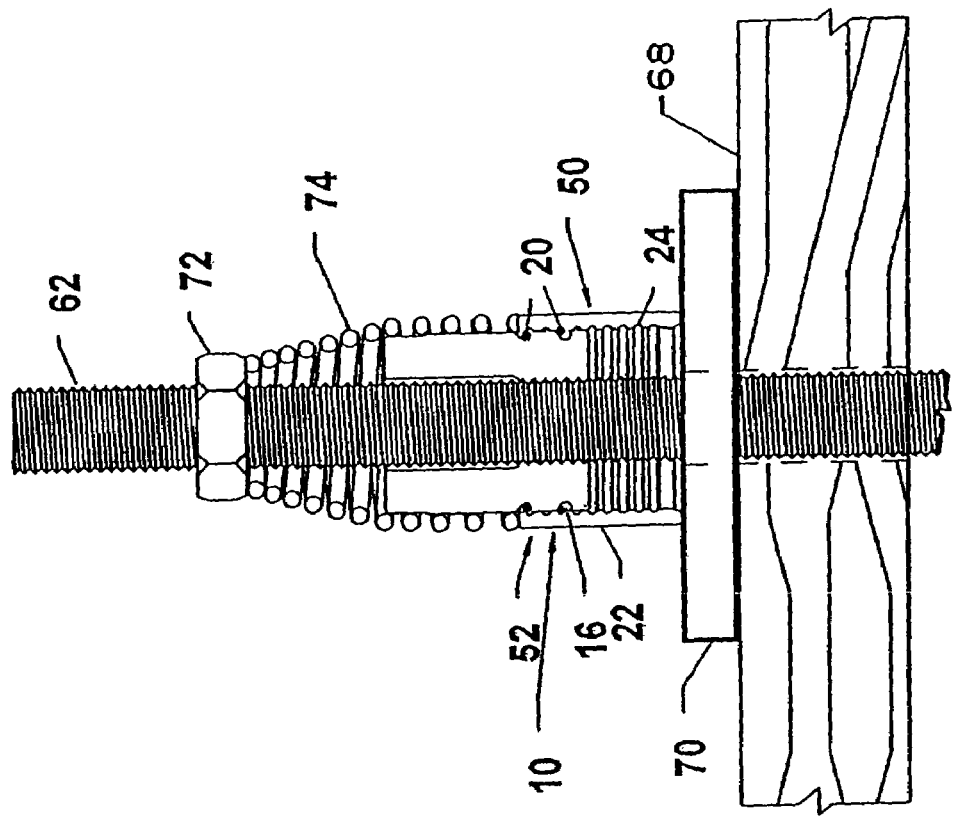
Figure 9:
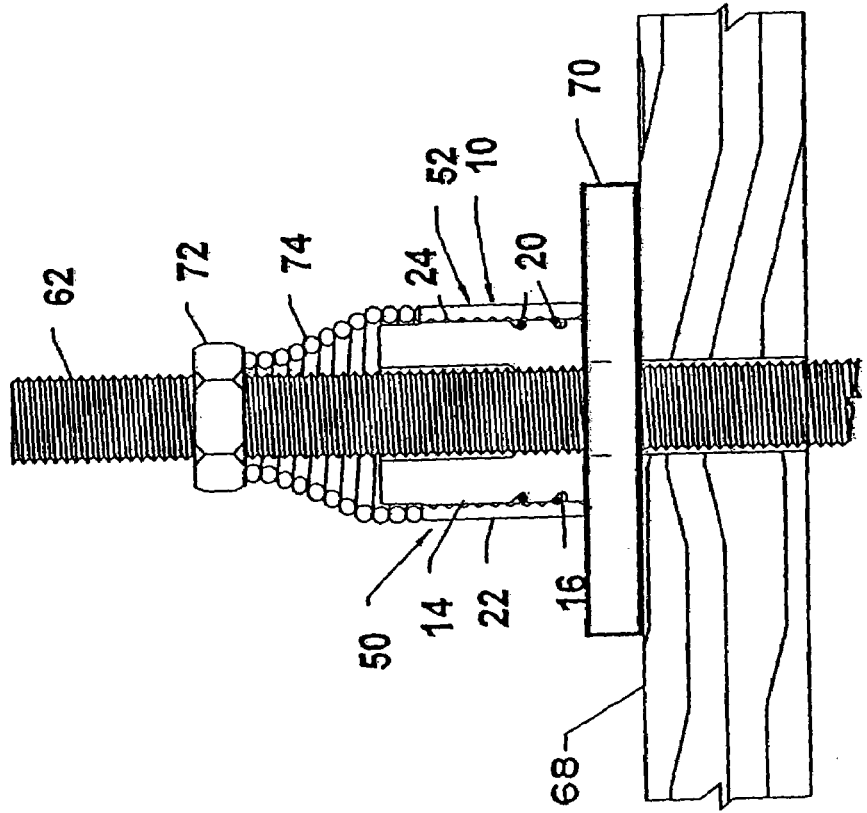

In FIG. 9, tie down 50 is shown, only in part, after the initial installation of an automatically adjusting assembly 52 centering on the utilization of the fastener assembly 10, arranged in a three member embodiment 12, arranged in an overall cylindrical form. In FIG. 10, this portion, in respect to this assembly 52 of the tie down system 50, is shown after the expected life of automatic adjustments to compensate for the shrinkage and compression of the wood frame structural components.

Figure 11:
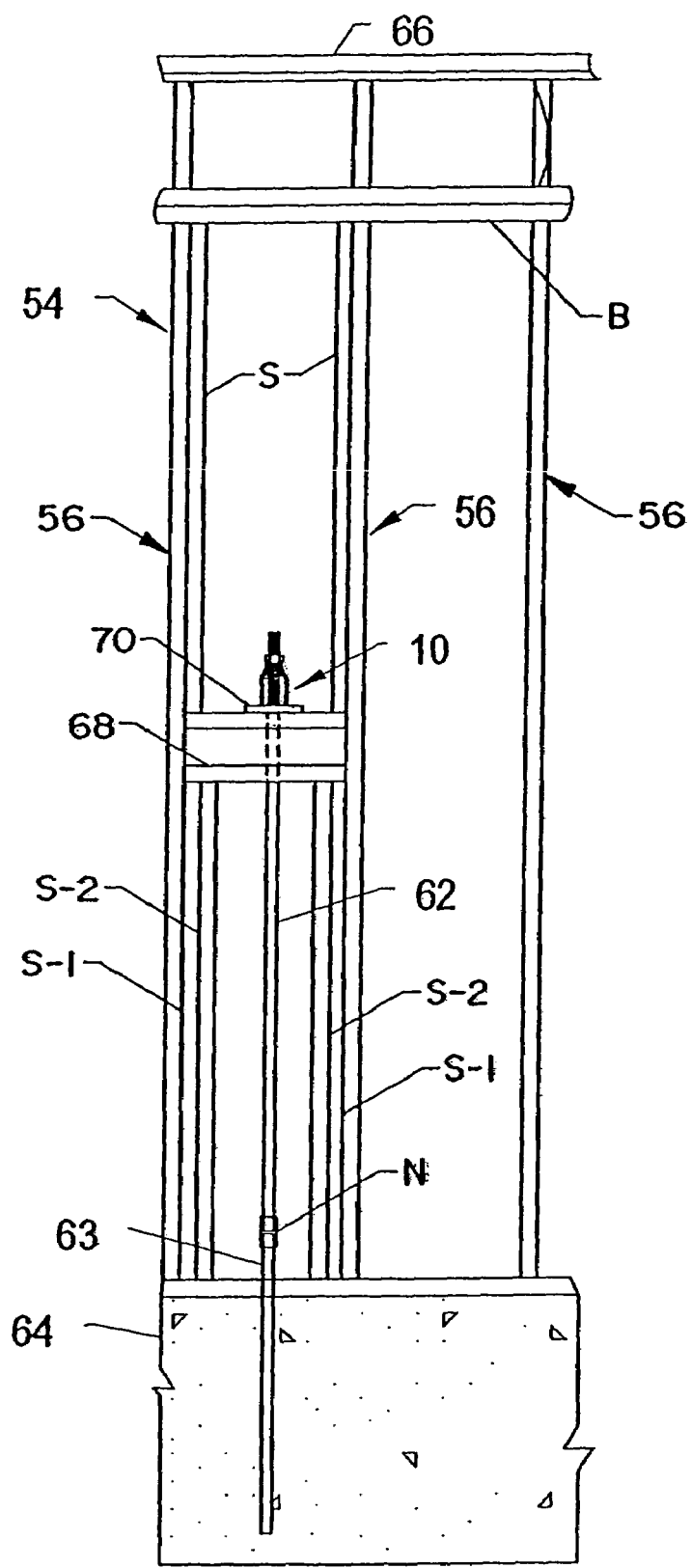
Figure 12:
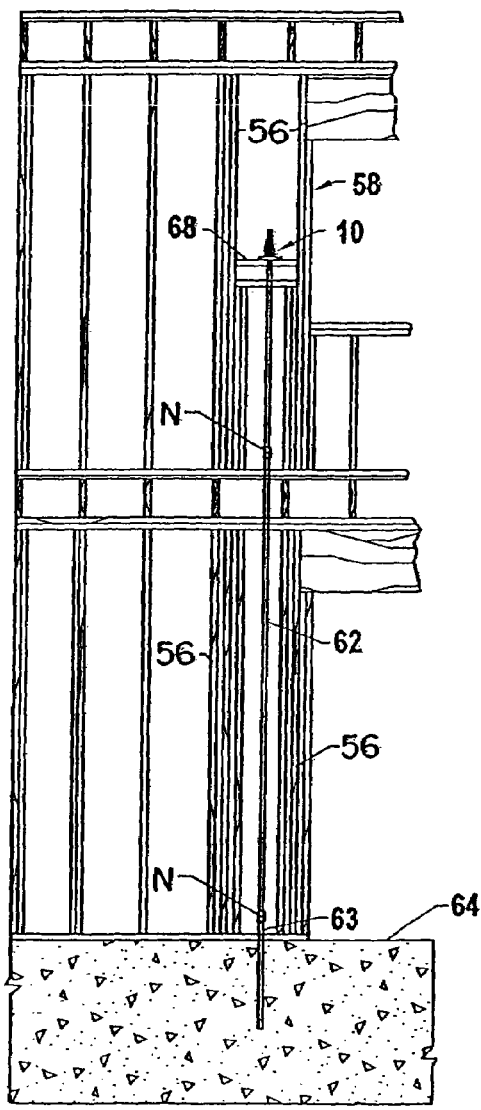
Figure 13:
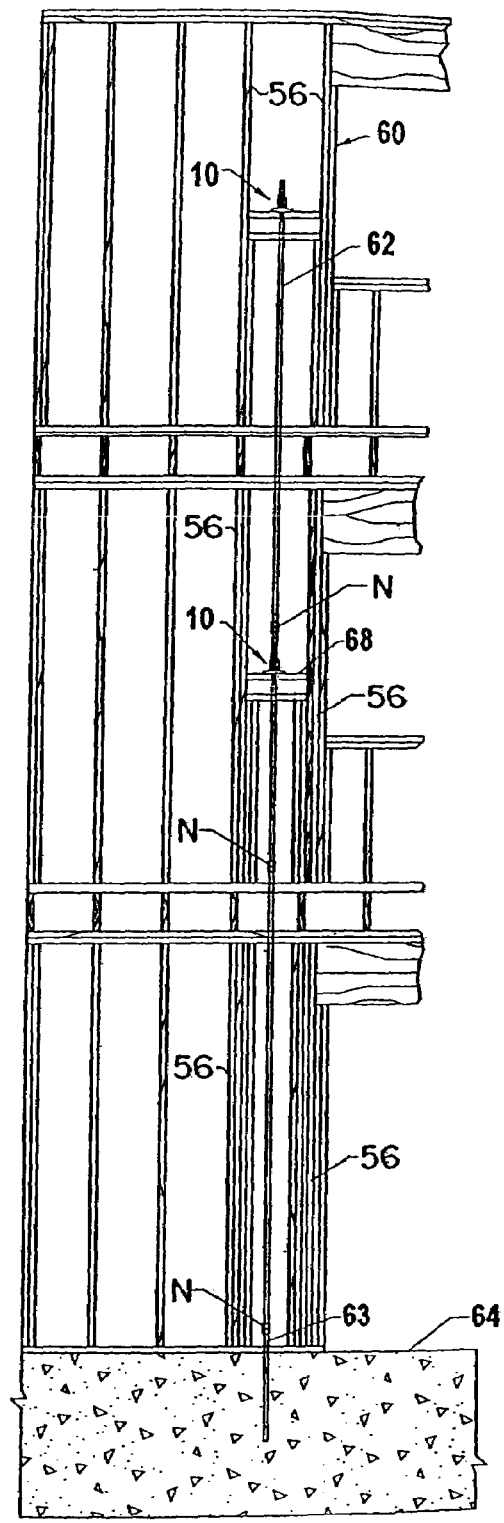

This portion, in respect to this assembly 52, of the tie down system 50 is illustrated in FIG. 11 in use in a portion of a one story building 54 having wood frame structural components 56. This automatically adjusting assembly 52 is shown in FIG. 12 in use in a portion of a two story building 58 having wood frame structural components 56. Also this assembly 52 and another assembly 52 are illustrated in FIG. 13 in use in a portion of a three story building 60. Beside components 56, and extending therefrom at the top thereof, are reinforcing studs S extending from cross beam B downward to member 68 and engaging the surface thereof. Similarly reinforcing stud members S1 and S2 extend upwardly from the foundation 64 to member 68. In this manner, fastener assembly 10 is positioned between the cross beam B and foundation 64. The studs S, S1 and S2 prevent lateral buckling of the shear wall components 56.

The automatically adjusting assembly 52, as particularly illustrated in FIGS. 9 and 10, is positioned about a threaded tie rod 62, which is essentially continuous from a selected high starting position in a respective wood structure building 54, 58 or 60, down to an anchor coupling tie-in securement 63 such as a nut N with the concrete or the like foundation 64 of the respective building. The threaded tie rod 62, via this automatically adjusting assembly 52, which includes the fastener assembly 16, is automatically adjustably secured to a selected wood member, such as a transverse member called a plate or ceiling beam 66, and/or to another transverse wood member 68, specially positioned and interconnected with other wood frame structural components 56.

The threaded tie rod 62, via the original connections made and the subsequent adjustments to be automatically made with respect to the wood frame structural components 56, via the utilization of one or more of these automatically adjusting assemblies 52, is always ready to withstand any possible earthquake and/or wind forces that might occur, and thereby protect the building.

Figure 14:
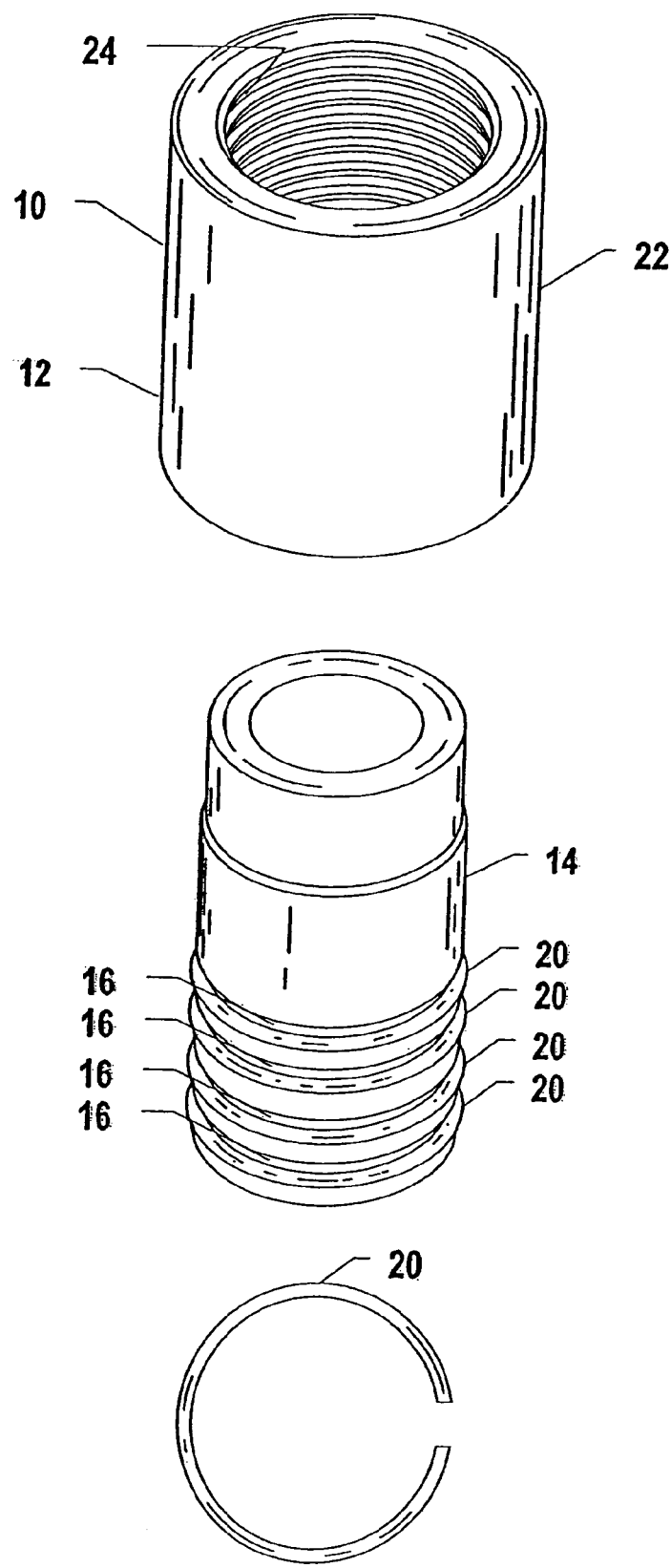

In FIG. 9, the automatically adjusting assembly 52 is shown after the installation thereof, before any compression of the wood has occurred, and before the shrinkage of the wood has occurred because of the drying of the wood. At a location of a transverse wood member 68, a metal base member 70 of this automatically adjusting assembly 52 is secured to this transverse wood member 68. Previously, the second member 22, i.e. the engagement member 22, made of metal, has been secured to this metal base or plate 70. Plate 70 of metal is engaged by metal member 22 which rotates thereon thereby eliminating destructive torque on the wood member or beam 68. Also previously, the first member 14, made of metal, after the placement of two third members 20, each formed as an almost complete resilient metal locking ring or component 20, as illustrated in FIG. 14, has been assembled with the second member, as shown in FIG. 9.

The spaced full receiving volumes 16, of the first member 14, i.e. the receiving component 14, have received the respective two locking components 20, i.e. the two resilient third members 20. Also, the respective lower positioned spaced partial receiving volumes 24 of the second member 22, i.e. the engagement component 22, have also received a portion, or are about to receive a portion, of a respective resilient third member 20, i.e. a respective locking component 20.

This automatically adjusting assembly 52 also includes a nut 72 threadably secured to the threaded tie rod 62 and positioned a designed distance above the second member 22, i.e. the engagement component 22, to initially position a fully compressed coil spring 74 about the threaded tie rod 62, while this spring is axially confined between the nut 72 and the second member 22, i.e. the engagement member.

After the wood frame structural components 56 of a wood frame constructed building have been in place over a period of time, they move because of shrinkage and/or compression of the wood and other building materials. To compensate for this movement, the automatically adjusting assemblies 52 do adjust, as illustrated in FIG. 10. The top located spaced partial receiving volumes 24 of the second member 22, i.e. the engagement member 22, are then serving to receive the third members 20, i.e. the locking component 20.

Then to compensate for the changing, now larger distance, between the nut 72 and the second member 22, i.e. the engagement member 22, the coiled spring 74 axially extends, yet the take up force created by the coiled spring 74 remains sufficient to keep the overall tie down system 50 firmly in place to quickly react to any possible occurring force caused by an earthquake and/or a wind force. It is to be noted in FIG. 13 that the fastener assemblies 10 in the multiple floor unit actuate independently of each other to take care of differential changes in each floor maintaining a firm tie down for each floor while operating on threaded tie rods 62 coupled in linear fashion by couples N.

Other Embodiments of the Fastener Assembly Arranged with Three Members

Other embodiments of the fastener assembly 10 centering on the cooperation of essentially the three members, i.e. the first member 14, also called the receiver component 14, the second member 22, also called the engagement 22, and the third member 20, also called the locking component 20, which in this three member embodiment must be a resilient third member 20, are illustrated essentially schematically in the respective partial sectional views of FIGS. 15 through 24.

Figure 15:
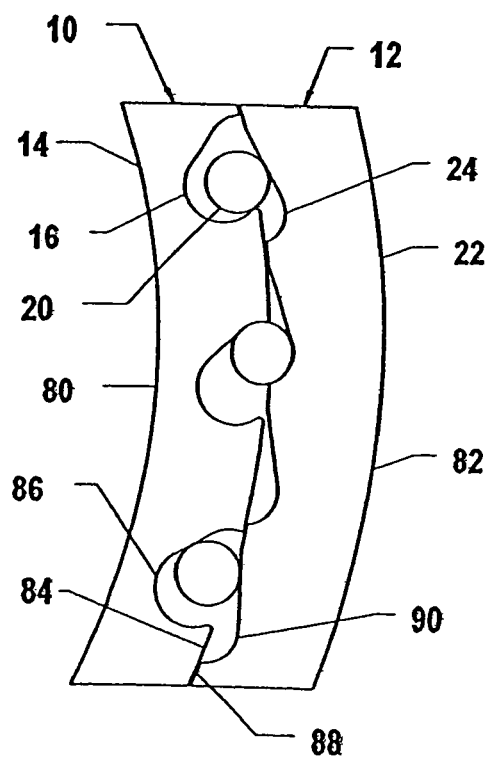

The first and second members 80 and 82, are formed in complementary arcuate portions, as illustrated in FIG. 15. The first member 80 has a convex surface 84, interrupted by the full receiving volumes 86. The second member 82 has a concave surface 88, interrupted by the partial receiving volumes 90. The locking components 20, i.e. the third member 20, have a circular cross section.

Figure 16:
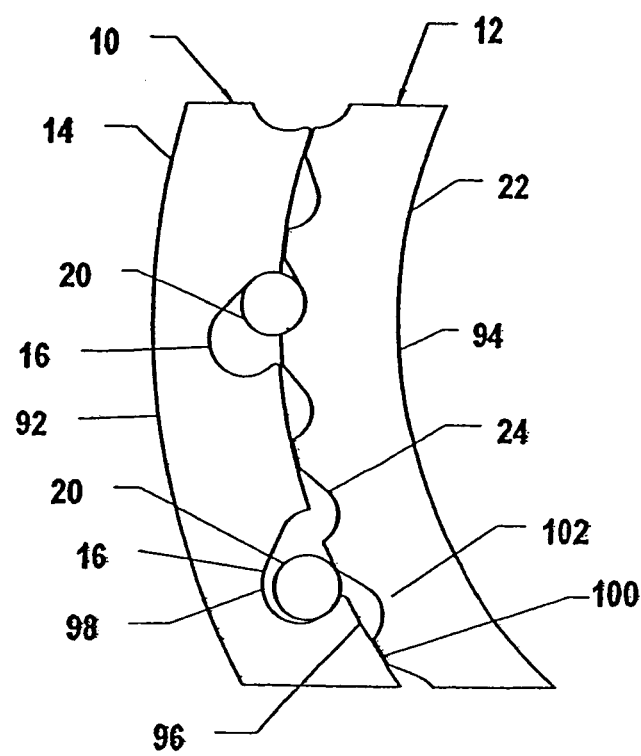

In FIG. 16, the first and second members 92 and 94 are also formed in complementary arcuate portions. However, the arcs are oppositely arranged. The first member 92 has a concave surface 96 interrupted by the full receiving volumes 98. The second member 94 has a concave surface 100 interrupted by the partial receiving volumes 102. The locking components 20, i.e. the third member 20, have a circular cross section.

Figure 17:
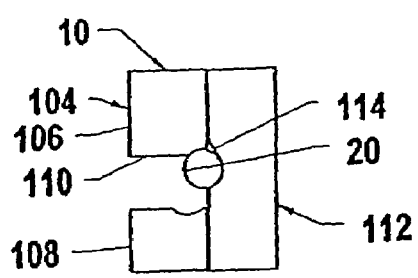
FIGS. 17 through 20 are schematic partial sectional views illustrating how the first member, of a three member embodiment, is composed of two sections, with one section being movable with respect to the other section, to create a changing full receiving volume thereof.
Figure 18:
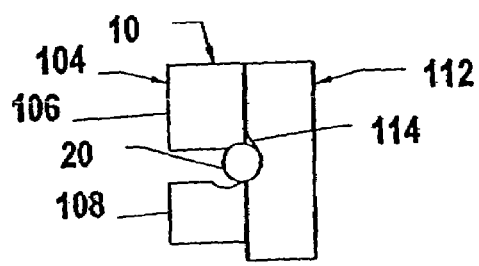
Figure 19:
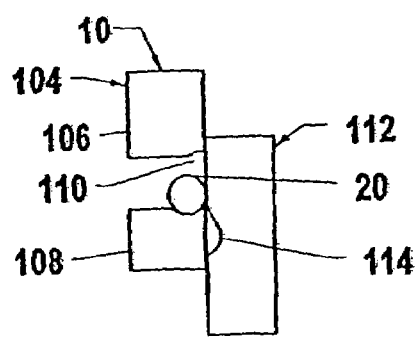
Figure 20:
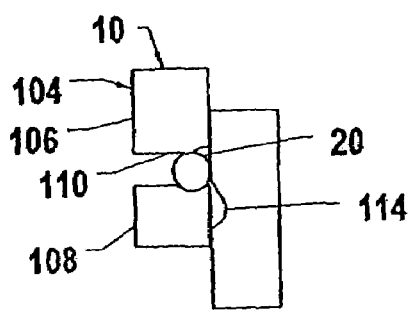

The first member 104 is formed in two sections 106 and 108, which are movable relative to one another, to thereby change the configuration of the full receiving volume 110, as illustrated in FIGS. 17 through 20. The second member 112 and the partial receiving volume 114 thereof remain similar in respect to other embodiments. The third member 20, the locking component 20, remains circular in cross section. In FIG. 17, the locking component 20 is positioned ready to create a lock. In FIG. 18, the locking position is shown. In FIG. 19, the locking component 20 is not locking and is being carried in the full receiving volume 110. In FIG. 20, the locking component 20 is being positioned to be quickly moved into the locking position thereof.

Figure 21:
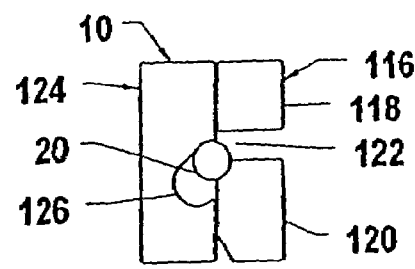
FIGS. 21 through 24 are schematic partial sectional views illustrating how the second member, of a three member embodiment, is composed of two sections, with one section being movable with respect to the other section, to create a changing partial receiving volume.
Figure 22:
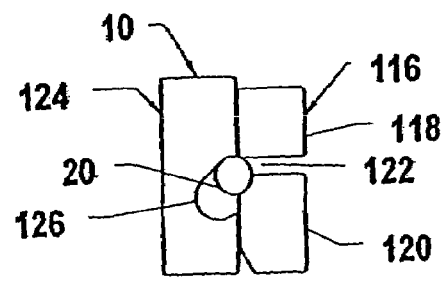
Figure 23:
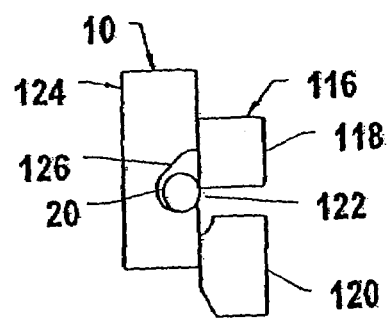
Figure 24:
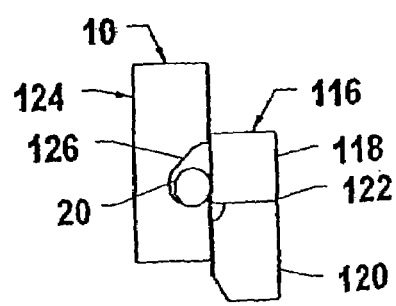

In FIGS. 21 through 24, the second member 116, is shown formed in two sections 118 and 120, which are movable relative to one another, to thereby change the configuration of the partial receiving volume 122. The first member 124 and the full receiving volume 126 thereof remain similar in respect to other embodiments. The third member 20, the locking component 20, remains circular in cross section. In FIG. 21, the locking component 20 is near the locking position thereof. In FIG. 22, the locking component 20 is in the locking position. In FIGS. 23 and 24, the locking component 20 is fully positioned in the full receiving volume 126 and is thereby kept out of the locking position.

These schematic views in FIGS. 15 through 24, indicate selected various embodiments of the fastener assembly 10, which have the three members, with the third member 20 being a resilient locking component 20.

An Assembly of Components which Include a Fastening Assembly of Three Members with the Second Member Having Two Sections, is Arranged to be a Quick Insert and Also a Reasonably Quick Release Overall Fastener, to Join Together Respective Ends of Rods, Such as the Tie-Rods of a Hold Down System of a Wood Structure The fastener assembly 10, in respect to the three member embodiments, has many applications where this fastener assembly 10 is combined with other assemblies, in turn serving many dynamic and/or statistic installations. In respect to one of these applications, illustrated in FIGS. 23 through 31, where elongated members, such as threaded tie-rods 62, are to be joined end for end to thereby create a longer threaded tie-rods 62, the fastener assembly 10 is connection to a larger assembly of components 128 to create an overall connector 129. When using this overall connector 129, to join the threaded tie-rods 62 together, all the motion that is required is an in-line axial quick movement of the respective ends of the threaded tie-rods 62 together. There is no need to rotate any parts during these securement operations. Then when a release is wanted, only a nut line reverse axial movement of the respective ends of the threaded tie-rods 62 is undertaken to quickly separate the respective threaded tie-rods 62.

The first member 130, also called a female member 130, has a full receiving volume 16 positioning the resilient ring locking component 20, i.e. the resilient third member 20. A nut 132 is used to secure this first member 130 to the end of one of the threaded tie-rods 62, as illustrated in FIGS. 25 and 26.

The male assembly 134 to be inserted into the female member 130, has a first nut 133 threaded on the other threaded tie-rods 62, followed by two sections 135 and 136, of the second member 138, and then followed by the second nut 140. As the two sections 135 and 136 are moved relative to one another, the partial receiving volume 142, they form, is changed, as illustrated in FIGS. 27 and 28.

The respective threaded tie-rods 62, arranged with the respective female member 130 and the male assembly 134, are thereafter axially joined by using axially directed forces, and they are then locked together, as illustrated in FIGS. 29 and 30.

If at a later time these threaded tie-rods 62 are to be separated, the first nut 133, also referred to as the jam nut 133, is turned sufficiently to move the sections 135 and 136 of the second member 138 together. When this occurs, the partial receiving volume 142 is eliminated sufficiently, so the locking component 20, i.e. the third member 20, is completely received in the full receiving volume 16 of the female member 130, i.e. the first member, as illustrated in FIGS. 31 and 32. Then a quick release axial pull separates the threaded tie-rods 62.

A Fastener Assembly Having the Three Basic Members is Arranged so the Resilient Third Member May be Conveniently Manipulated from an Outside Location When the fastener assembly 10 is arranged in three members and is joined with other components in some applications, there may be times when the fastener assembly 10 must be quickly released. An embodiment serving this need illustrated in FIGS. 33, 34, and 35. The two alike locking components 144, serving as a resilient third members 144, have finger accessible portions 146, which extend through recesses 148 in the first member 14 and beyond into the open surrounding area to be finger manipulated. When the finger accessible portions 146 are moved, the locking portion of the third member 20 is temporarily eliminated. Thereafter, the first and second members 14 and 22 are axially quickly separated, also with whatever other components they are connected to, which are not illustrated.

A Fastener Assembly Having the Three Basic Members is Arranged in a Planar Assembly In FIGS. 36, 37 and 38, a fastener assembly 10 having the three basic members is arranged in a planar assembly 150. The second member 152 has a central-through-passageway 154, and the partial receiving volumes 156 are accessible from this passageway 154. The first member 158 is inserted in the second member 152 and has two full receiving curved volumes 160, which subsequently move relative to the partial receiving volumes 156, and the lengths of the first member 158 and the second member 152 are the same. The third members 162, i.e. the locking components 162 are resilient and bow upwardly under tension, and resiliently flex between both the full receiving curved volumes 160 and the multiple partial receiving volumes 156 during relative movement of first and second members 152 and 158.

A Fastener Assembly Having Four Basic Members Arranged with Other Members to Create, for Example, a Winch Type Gear System, the Fourth Member Being Required Because the Third Members are not Resilient As illustrated in FIGS. 39 and 40, a fastener assembly 10 having at least four basic members, i.e. components, is arranged with other components to be a winch-type gear system 168. The fourth member becomes the resilient member which is used in positioning the non-resilient third member, which is the locking component.

The drive gear 170 transmits power to the driven gear 172, via components, which function as the components described previously as a fastener assembly 10, and are in effect a fastening assembly 174 or connecting assembly 174, positioned between the drive gear 170 and the driven gear 172. The drive gear 170 has at the end periphery thereof the first member 176, which has the full receiving volumes 178. The driven gear 172 has at the interior circular structure thereof, the second member 180, which has the many partial receiving volumes 182. A circular spring 184 is positioned, within a circular volume 186, provided in the first member 176, to be in constant resilient contact with the locking components 188, i.e. the third member 188, which are cylindrical in shape, and positioned within each full receiving volume 178.

During clockwise movement of the driving gear 170, the locking components 188 move to be occupying space in both the full receiving volumes 178 and the partial receiving volumes 182, and to thereby lock the drive gear to the driven gear. During the counterclockwise movement of the driving gear 170, the locking components 188 are moved periodically to be fully within the full receiving volumes 178, freeing the driven gear 172 from the driving gear 170, via incremental movements.

Another Fastener Having Four Basic Members Arranged with Other Members to Create, for Example, a Driving Spur Gear and a Larger Driven Gear System or Assembly, the Fourth Member being Required Because the Third Members are not Resilient As illustrated in FIG. 41, a fastener assembly 10, having at least four basic members, i.e. four basic components, is arranged with other components to be a driving spur gear and a larger driven gear system 192. The peripheral structure 194 of the driving spur gear 196 is formed to serve as the first member 198, i.e. the receiver component 198, having the full receiving volumes 200. The peripheral structure 202 of the large driven gear 204 is formed to serve as the second member 206, i.e. the engagement component 206, having the partial receiving volumes 208. The third member 210, the locking components 210, are cylindrical members which are not resilient. They are continuously being forced out of the full receiving volumes 200, by a circular spring 212, serving as the fourth resilient member, which is positioned in a receiving volume 214 of the driving spur gear 196. These third members 210 are constrained from leaving the full receiving volumes 200, by a non rotating circumferential guiding structure 216, also called a guiding race 216. This guiding structure 216 is not a complete encirclement, thereby leaving an open circumferential distance, so the third members 210 will be moved radially outwardly, under the force of the circular spring 212, i.e. the fourth member 212, to contact partial receiving volumes 208 of the larger driving gear 204.

During the clockwise rotation of the driving spur gear 196, the third members 210, in their cylindrical form of locking components 210 are moved, via the circular spring force, while guided by the cam surfaces of both the full and partial receiving volumes 200 and 208 to reach their respective sequential locking positions, thereby transmitting the driving power to the larger driven gear 204, to rotate this gear 204 in a counterclockwise direction.

During the possible counterclockwise rotation of the driven ring gear 196, the third members 210, are sequentially guided back into the full receiving volumes 200 against the force of circular spring 212, serving as the fourth member 212, and then there is essentially no clockwise rotation of the larger driven gear 204.

The Convenient Placement of an Embodiment on an Extended Threaded Tie Rod by Utilizing a First Member which is Made in Two Halves of Cylinder As illustrated in FIGS. 42 through 47, the fastener assembly 10 is provided in an embodiment 220 to facilitate the convenient placement, in less time, of this embodiment 220 at a selected location on an extended threaded tie-rod 62. The first member 222 is made of two alike cylinder halves 224 and 226. They have internal threaded 228 to mate with the external threads 230 of the threaded tie-rod 62. They have the full receiving volumes 232 to subsequently receive respective locking components 234, during the positioning of this embodiment 220 at the selected location along the threaded tie-rod 62.

As shown in FIG. 42, the halves 224 and 226, first indicated by the phantom lines, are positioned independently, arriving from respective opposite directions, to be fitted or mated to the threaded tie-rod 62. Subsequently, respective split ring locking components 234 are axially directed over the mated 224 and 226 and positioned in the full receiving volumes 232. Then is illustrated in FIGS. 43, 44, and 45, the second member 238, having partial receiving volumes 240, is axially directed to advance to the respective overlapping positions in the illustrated direction when axial relative movement is possible between the first member 222 and the second member 238. The split ring locking components 234 and the second member 238 are pre-positioned on the extended threaded tie-rod 62 before it is installed in a selected location, not shown.

In the fully overlapping position shown in FIG. 45, which is the designated in-use position, the second member 238 of this embodiment is securable to a member, not shown, which is supported at this location along the threaded tie-rod 62, when this positioning is no longer required at this in-use position, then the axial movement of the second member 238 is continued as shown in FIGS. 46 and 47. When the second member 2238 is cleared from the first member 222, the two alike cylindrical halves 224 and 226 are removed as indicated by the phantom lines FIG. 47.

The Convenient Placement of an Embodiment of any Extended Member Having a Circular Cross Section by Utilizing a Second Member which is Made with an Axially Directed Opening to Receive a Portion of the Extended Member As illustrated in FIG. 48, an embodiment 244 is provided, wherein the first member 246, having a smooth internal surface 248, and pre-fitted with locking components 234, received in full receiving volumes 232, along with other like sub assemblies 250, not shown, are placed about an extended member 252, having a circular cross section. At a selected location along the extended member 252 the sub assembly 250 is positioned on the extended member 252. Then the second member 254 having partial receiving volumes 240, and also having an axially directed opening 256, is moved to be positioned about the extended member 252. Thereafter, the second member 254 is moved axially for one way axial movement relative to the first member 246 to fully receive the first member 246. At this selected location, another selected part, not shown, is often secured to the second member 254 during the fabrication or manufacture of an overall product or assembly, not shown.

The Common Features and Common Objective Pertaining to All the Various Embodiments of the Fastener Assembly Serving as a Product Itself or Incorporated into Other Assemblies Serving as Products Throughout the illustrated and non-illustrated embodiments of the direct utilization of the fastener assembly 10 as a product, or the incorporation of the fastener assembly 10 in other products, the objective are like or similar. Any sustained movement of a first member relative to a second member in one direction is essentially prevented, short of the unwanted forcible destruction of either or both the first and/or second member. Whereas, the relative movement in the other direction of the first member and the second member, caused by an intended force, is sequentially controlled, when there is an active force being provided by a resilient member.

In some embodiments, when a special force is selectively used to withdraw the otherwise active force provided by the resilient member, during the designed time, then the unrestricted movement of the first and second members in either relative direction is undertaken.

In some embodiments, the resilient members is the third member serving as the locking component. In other embodiments, the third member, serving as the blocking member, is not resilient and must be constantly directed to the locking position thereof, by the resilient force created by a fourth member.

In all embodiments, the first member has the full receiving volumes to fully receive, at sequential times, the third member serving as the locking component. In all embodiments, the second member has the partial receiving volumes to receive portions of the third member, when the locking positions of the first, second, and third member occur.

When the relative motion is attempted in one direction, the locking position of the first, second, and third members occurs quickly and remains to keep the first and second members from moving relative to one another. When the relative motion is undertaken in the opposite direction, the sequential periods of relative movements occur in reference to periods of forces being applied to move the first member relative to the second member.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A fastener system for securing a building wall to a foundation, comprising:

a) a fastener assembly for being operably attached to a building wall;
b) a tie rod having one end for being anchored to a building foundation and another end secured to said fastener assembly; and
c) said fastener assembly comprising:
   i) a first member disposed within a second member;
   ii) said tie rod being axially disposed through said first member;
   iii) one of said first and second members being fixed relative to said tie rod and another one of said first and second members being movable relative to said tie rod;
   iv) a nut secured to said tie rod;
   v) a coil spring disposed around said tie rod and between said nut and said another one of said first and second members;
   vi) said another one of said first and second members for being operably fixed to the wall;
   vii) said coil spring for operably biasing said another one of said first and second members against the wall;
   viii) said first and second members including first and second opposing cylindrical walls, respectively;
   ix) said first cylindrical wall including a plurality of first receiving volumes;
   x) said second cylindrical wall including a plurality of second receiving volumes;
   xi) a resilient member disposed between said first and second cylindrical walls, said resilient member is biased to occupy one of said first and second receiving volumes;
   xii) said first and second receiving volumes are configured in cross-section such that when said another one of said first and second members is axially moved downwardly relative to said one of said first and second members, said resilient member is shifted into and fully received within another one of said first and second volumes, thereby allowing downward movement of said another one, of said first and second members; and
   xiii) said first and second volumes are configured in cross-section such that when said another one of said first and second members is moved axially upwardly relative to said one of said first and second members, said resilient member is only partially received within said one of said first and second volumes, thereby precluding upward movement of said another one of said first and second members.

2. A fastener system as in claim 1, wherein:
a) each of said first volumes in cross-section includes an inclined first cam surface;
b) each of said second volumes in cross-section includes an inclined second cam surface; and
c) said first and second cam surfaces when disposed opposite each other form an inverted V-shape.

3. A fastener system as in claim 1, wherein said resilient member is circular in cross-section.

4. A fastener system as in claim 1, wherein:
a) said plurality of first receiving volumes are identical to each other in cross-section; and
b) said plurality of second receiving volumes are identical to each other in cross-section.

5. A fastener system as in claim 1, wherein said resilient member when partially received within said one of said first and second volumes has less than half of its cross-sectional area received in said one of said first and second volumes.

6. A fastener system as in claim 1, wherein said resilient member is of a harder material than at least one of said first and second members.

7. A fastener system as in claim 1, wherein said spring is helical.

8. A fastener system as in claim 1 wherein said spring is conical.

9. A fastener system as in claim 1, wherein said first and second members are cylindrical.

10. A fastener system for securing a building wall to a foundation, comprising:
a) a plurality of fastener assemblies for being operably attached to a building wall;
b) a tie rod passing through said fastener assembles, said tie rod having one end for being anchored to a building foundation;
c) said fastener assemblies being secured along the length of said tie rod; and
d) each fastener assembly comprising:
   i) a first cylindrical member disposed within a second cylindrical member;
   ii) said tie rod being axially disposed through said first cylindrical member;
   iii) one of said first and second cylindrical members being fixed relative to said tie rod and another one of said first and second cylindrical members for being fixed relative to the building wall;
   iv) said another one of said first and second cylindrical members being movable relative to said one of said first and second cylindrical members in a downward axial direction when the wall moves downwardly through said tie rod due to wall settlement; and
   v) said another one of said first and second cylindrical members being locked relative to said one of said first and second cylindrical members in an upward axial direction thereby to prevent said another one of said first and second cylindrical members from returning to its original position.

11. A fastener system as in claim 10, wherein:
a) said first and second cylindrical members include first and second opposing cylindrical walls, respectively;
b) said first cylindrical wall includes a plurality of first receiving volumes;
c) said second cylindrical wall includes a plurality of second receiving volumes;
d) a resilient member disposed between said first and second cylindrical walls, said resilient member is biased to occupy one of said first and second receiving volumes;
e) said first and second receiving volumes are configured in cross-section such that when said another one of said first and second cylindrical members is moved in said downward axial direction, said resilient member is shifted into and fully received within another one of said first and second volumes, thereby allowing downward movement of said another one of said first and second cylindrical members; and
f) said first and second volumes are configured in cross section such that when said another one of said first and second cylindrical members is moved in said upward axial direction, said resilient member is only partially received within said one of said first and second volumes, thereby precluding upward movement of said another one of said first and second cylindrical members.

12. A fastener system as in claim 11, wherein each of said fastener assemblies further comprises:
a) a nut secured to said tie rod; and
b) a coil spring disposed around said tie rod and between said nut and said another one of said first and second cylindrical members to bias said another one of said first and second cylindrical members in said downward axial direction.

13. A fastener system as in claim 11, wherein:
a) each of said first volumes in cross-section includes an inclined first cam surface;
b) each of said second volumes in cross-section includes an inclined, second cam surface; and
c) said first and second cam surfaces when disposed opposite each other form an inverted V-shape.

14. A fastener system as in claim 11, wherein:
a) said plurality of first receiving volumes are identical to each other in cross-section; and
b) said plurality of second receiving volumes are identical to each other in cross-section.

15. A fastener system as in claim 10, wherein said resilient member is circular in cross-section.

16. A fastener system as in claim 10, wherein said resilient member when partially received within said one of said first and second volumes has less than half of its cross-sectional area received in said one of said first and second volumes.

17. A fastener system as in claim 10, wherein said resilient member is of a harder material than at least one of said first and second cylindrical members.

18. A fastener system as in claim 10, wherein said spring is helical.

19. A fastener system as in claim 12 wherein said spring is conical.

* * * * *